US 12,448,756 B2

(12) United States Patent
Bhupatiraju

(10) Patent No.: US 12,448,756 B2
(45) Date of Patent: Oct. 21, 2025

(54) VEHICLE VISION

(71) Applicant: Zimeno Inc., Livermore, CA (US)

(72) Inventor: Rama Venkata Bhupatiraju, Fremont, CA (US)

(73) Assignee: Zimeno Inc., Livermore, CA (US)

( * ) Notice: Subject to any disclaimer, the term of this patent is extended or adjusted under 35 U.S.C. 154(b) by 52 days.

(21) Appl. No.: 18/388,760

(22) Filed: Nov. 10, 2023

(65) Prior Publication Data

US 2024/0175244 A1 May 30, 2024

Related U.S. Application Data

(60) Provisional application No. 63/524,849, filed on Jul. 3, 2023, provisional application No. 63/429,123, filed on Nov. 30, 2022.

(51) Int. Cl.

| E02F 9/26 | (2006.01) |
|---|---|
| B60R 1/24 | (2022.01) |
| G06T 7/12 | (2017.01) |
| G06T 7/60 | (2017.01) |
| G06V 20/58 | (2022.01) |
| H04N 5/262 | (2006.01) |
| H04N 5/268 | (2006.01) |
| H04N 7/18 | (2006.01) |

(52) U.S. Cl.
CPC .......... *E02F 9/261* (2013.01); *B60R 1/24* (2022.01); *G06T 7/12* (2017.01); *G06T 7/60* (2013.01); *G06V 20/58* (2022.01); *H04N 5/2628* (2013.01); *H04N 5/268* (2013.01); *H04N 7/181* (2013.01); *B60R 2300/105* (2013.01); *B60R 2300/303* (2013.01); *B60R 2300/802* (2013.01); *G06T 2207/20092* (2013.01); *G06T 2207/30252* (2013.01)

(58) Field of Classification Search
CPC ...... E02F 9/261; B60R 1/24; B60R 2300/105; B60R 2300/303; B60R 2300/802; G06T 7/12; G06T 7/60; G06T 2207/20092; G06T 2207/30252; G06V 20/58; H04N 5/2628; H04N 5/268; H04N 7/181
See application file for complete search history.

(56) References Cited

U.S. PATENT DOCUMENTS

| 4,844,685 A | 7/1989 | Sagaser |
|---|---|---|
| 5,297,916 A | 3/1994 | Fujikawa et al. |
| 6,052,647 A | 4/2000 | Parkinson et al. |
| 7,229,139 B2 | 6/2007 | Lu et al. |

(Continued)

FOREIGN PATENT DOCUMENTS

WO 2022196242 A1 9/2022

OTHER PUBLICATIONS

Ahamed et al. "Advancements of wave energy converters based on power take off (PTO) systems: A review." Ocean Engineering 204 (2020): 107248. Retrieved on Jan. 8, 2024 (Jan. 8, 2024) from entire document, 47 pages.

(Continued)

*Primary Examiner* — Farzana Hossain
(74) *Attorney, Agent, or Firm* — Rathe Lindenbaum LLP

(57) ABSTRACT

A vehicle vision system is configured to visibly present a view of a scene to an operator, the operator's view of the scene being otherwise visibly obstructed by an obstruction movably supported by a vehicle.

22 Claims, 14 Drawing Sheets

(56) References Cited

U.S. PATENT DOCUMENTS

| | | |
|---|---|---|
| 8,306,697 B2 | 11/2012 | Lu et al. |
| 8,340,872 B2 | 12/2012 | Mintah et al. |
| 10,816,063 B2 | 10/2020 | Spitz |
| 2001/0019356 A1 | 9/2001 | Takeda et al. |
| 2001/0044685 A1 | 11/2001 | Schubert |
| 2009/0112423 A1 | 4/2009 | Foster et al. |
| 2010/0206100 A1 | 8/2010 | Vyas et al. |
| 2011/0224858 A1 | 9/2011 | Bissontz |
| 2012/0315120 A1 | 12/2012 | Hyder |
| 2014/0055077 A1 | 2/2014 | Barrass et al. |
| 2015/0176253 A1 | 6/2015 | Taylor et al. |
| 2015/0275469 A1 | 10/2015 | Fredrickson et al. |
| 2015/0310273 A1* | 10/2015 | Shreve .................. G06T 5/77 382/103 |
| 2016/0273196 A1 | 9/2016 | Funk et al. |
| 2017/0212517 A1* | 7/2017 | Houle .................. B66F 9/07509 |
| 2018/0206392 A1 | 7/2018 | Matsuzaki |
| 2018/0290592 A1 | 10/2018 | Stein et al. |
| 2018/0297204 A1 | 10/2018 | Krasny et al. |
| 2018/0373264 A1 | 12/2018 | Madsen et al. |
| 2019/0084156 A1 | 3/2019 | Yasuda et al. |
| 2019/0119087 A1 | 4/2019 | Fischbach et al. |
| 2019/0276281 A1 | 9/2019 | Hofmeister et al. |
| 2020/0071144 A1 | 3/2020 | Draayer et al. |
| 2020/0131741 A1 | 4/2020 | Lehmann et al. |
| 2020/0300691 A1 | 9/2020 | Bonthuis et al. |
| 2020/0340213 A1 | 10/2020 | Zimmerman et al. |
| 2020/0362539 A1* | 11/2020 | Plouzek .................. H04N 7/181 |
| 2020/0369498 A1 | 11/2020 | Ekshinge et al. |
| 2021/0000013 A1 | 1/2021 | Robertson et al. |
| 2021/0131072 A1 | 5/2021 | Gratton et al. |
| 2021/0170947 A1 | 6/2021 | Yunus et al. |
| 2021/0222743 A1 | 7/2021 | Whitney et al. |
| 2021/0264624 A1 | 8/2021 | Fu et al. |
| 2021/0301494 A1 | 9/2021 | Berry et al. |
| 2021/0316617 A1 | 10/2021 | Pugh |
| 2022/0106764 A1 | 4/2022 | Iwasaki et al. |
| 2022/0120060 A1 | 4/2022 | Ready-Campbell et al. |
| 2022/0126816 A1 | 4/2022 | Von Holst et al. |
| 2022/0130063 A1 | 4/2022 | Thomas et al. |
| 2022/0162048 A1 | 5/2022 | Meijer et al. |
| 2022/0333344 A1 | 10/2022 | Kean et al. |
| 2022/0350991 A1 | 11/2022 | Vesperman et al. |
| 2022/0382274 A1 | 12/2022 | Kean et al. |
| 2022/0412050 A1 | 12/2022 | Hoaby et al. |
| 2023/0106964 A1* | 4/2023 | Uro .................. B66F 9/0755 701/2 |
| 2024/0026651 A1* | 1/2024 | Nishi .................. G06T 11/206 |
| 2025/0001939 A1* | 1/2025 | Lee .................. H04N 5/265 |

OTHER PUBLICATIONS

Bostelman et al. "Methods for improving visibility measurement standards of powered industrial vehicles." Safety science 62 (2014): 257-270. Retrieved on Jan. 15, 2024 (Jan. 15, 2024) from entire document, 14 pages.

International Search Report and Written Opinion for PCT/US2023/037216; mail date Jan. 23, 2024; 15 pages.

International Search Report and Written Opinion for PCT/US2023/080816; mail date Feb. 12, 2024; 12 pages.

International Search Report and Written Opinion for PCT/US2023/081457; mail date Mar. 13, 2024; 7 pages.

International Search Report and Written Opinion for PCT/US2024/015857; mail date Jun. 21, 2024; 12 pages.

International Search Report and Written Opinion for PCT/US2024/015859; mail date Jun. 4, 2024; 8 pages.

International Search Report and Written Opinion for PCT/US2024/015860; mail date Jun. 4, 2024; 7 pages.

International Search Report and Written Opinion for PCT/US2024/015878; mail date May 20, 2024; 7 pages.

International Search Report and Written Opinion for PCT/US2024/020789; mail date Jul. 16, 2024; 6 pages.

* cited by examiner

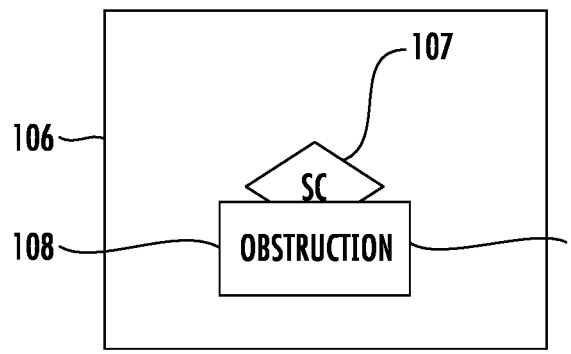
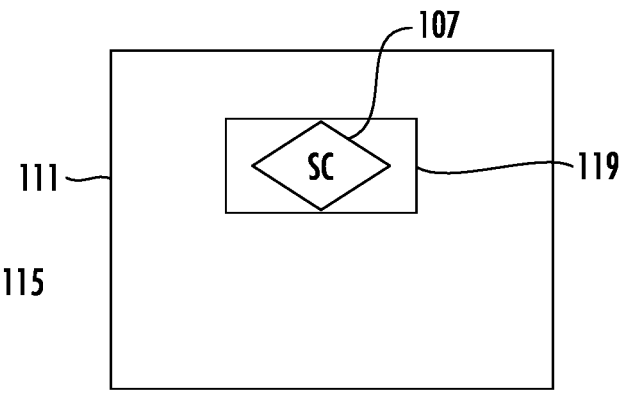
FIG. 3     FIG. 4
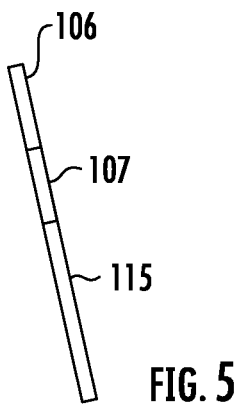 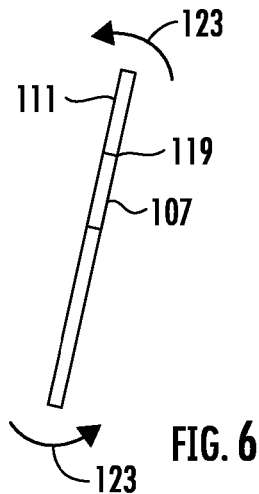 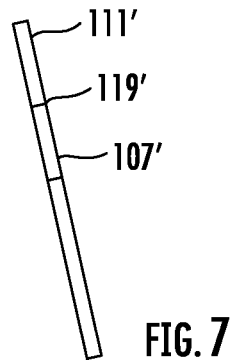
FIG. 5     FIG. 6     FIG. 7
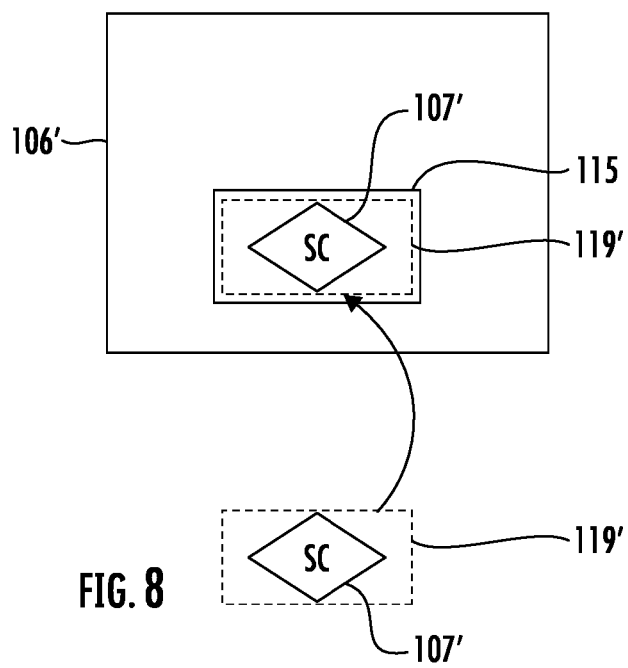
FIG. 8

VEHICLE VISION

CROSS-REFERENCE TO RELATED PATENT APPLICATIONS

The present non-provisional application claims priority from U.S. provisional patent Application Ser. No. 63/429,123 filed on Nov. 30, 2022, by Rama Venkata Bhupatiraju and entitled INVISIBLE BUCKET, and U.S. provisional patent Application Ser. No. 63/524,849 filed on Jul. 3, 2023, by Gatten et al. and entitled VEHICLE CONTROL, the full disclosure of which are hereby incorporated by reference.

BACKGROUND

Vehicles often comprise mechanisms to carry, lift and lower functional tools of the vehicle. Examples of such vehicles may be found in various industries such as construction, agriculture and warehousing. Some functional tools are releasably or removably attached to a remainder of the vehicle, facilitating disconnection of such functional tools for exchange, repair or replacement. A first example of such a functional tool is a head or header on a harvester. The head or header may be used to sever and gather various crops. Such headers may include devices such as a cutter bar, a stalk roller, stripper plates, gathering chains or rotating gathers/baffles.

A second example of such a functional tool is a load carrying tool. The load carrying tool may be used to lift and carry various loads. Examples vehicles that may comprise such load carrying tools include, but are not limited to, various loaders such as tractors, skid steers, excavators, backhoes, front loader vehicles, pallet vehicles, forklifts and the like. Examples of load carrying tools include, but are not limited to, forks, buckets and the like for engaging, lifting, lowering and carrying a load. Such load carrying tools may extend forwardly from the vehicle or rearwardly from the vehicle. Such loads may have a variety of different forms such as a fluid material, a particulate material, a structure, a mass of material such as a bale of material, and a container or a pallet which may serve as a platform for a remainder of the load.

Other examples of functional tools that are carried by vehicle and that are movable between raised and lowered positions comprise augers or drills, cutters, and blades used to push earth or snow.

When lifted to or carried at particular heights, the functional tool of the vehicle may obstruct a view of the vehicle's operator. For example, the head of a harvester may be raised to a position that obstructs the view of the operator. A blade or auger of a vehicle may be raised to a position that obstructs the view of the operator. The load carrying tool, such as a bucket, may be raised to a position that obstructs the view of the operator. In some circumstances, the load carrying tool may be at a position that does not obstruct the view of the operator, but the load being carried by the tool extends beyond the tool so as to block or obstruct the view of the operator.

BRIEF DESCRIPTION OF THE DRAWINGS

FIG. 3 is a diagram depicting an example view obstructed image captured by a first camera supported by an example vehicle.

FIG. 4 is a diagram depicting an example view unobstructed image captured by a second camera supported by the example vehicle.

FIG. 5 is a diagram illustrating a side view of the example image of FIG. 3.

FIG. 6 is a diagram illustrating a side view of the example image of FIG. 4.

FIG. 7 is a side view illustrating the example image of FIG. 6 following geometric transformation.

FIG. 8 in a diagram schematically illustrating replacement of a first portion of the image of Figure with a second corresponding portion of the geometrically transformed image of FIG. 4.

Figure 1:
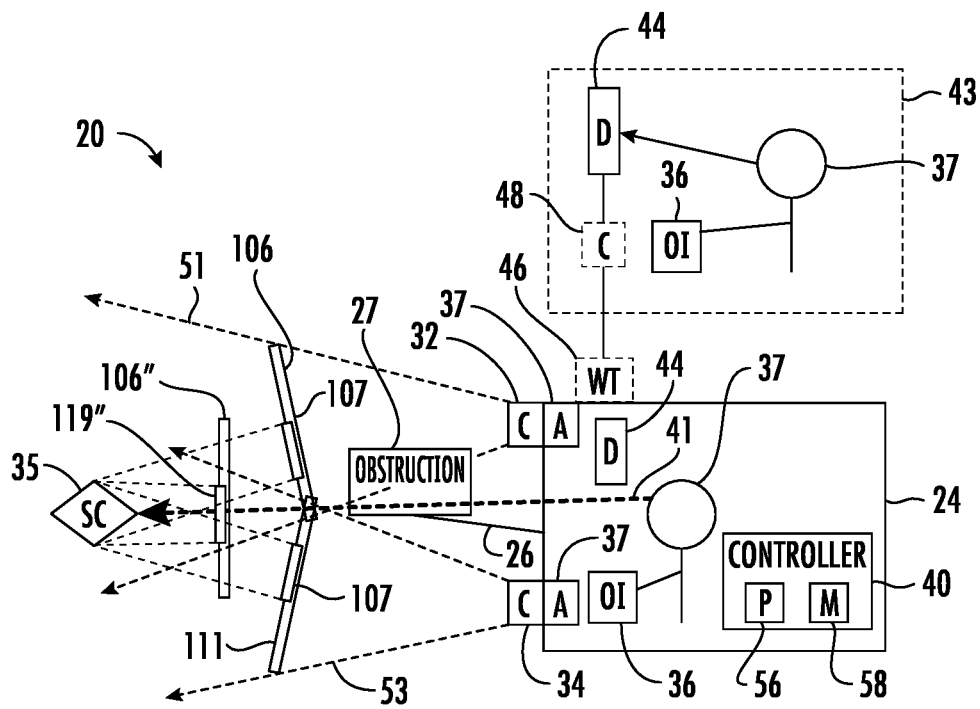
FIG. 1 is a diagram schematically illustrating portions of an example vehicle vision system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example vehicle vision systems, methods and computer-readable mediums that provide an operator with a view of a scene from a particular perspective otherwise obstructed by an obstruction movably supported by a vehicle. The vehicles are configured to carry, raise and lower functional tools such as harvester heads, blades and load carrying tools. Example load carrying tools may be in the form of buckets, forks, spears and the like. Such loads may be carried in front of the vehicle and/or at a rear of the vehicle. In some circumstances, the load carrying tool, whether loaded or unloaded, may constitute an obstruction to the operator's view when raised to particular heights. In some circumstances, the load carried by the load carrying tool may project beyond the load carrying tool and may constitute an obstruction to the operator's view when at particular heights. In some circumstances, the load carrying tool and its carried load, together, are sufficiently shaped or sized so as to constitute an obstruction to the operator's view when at particular heights.

Disclosed are example vehicle vision systems, methods and computer-readable mediums that provide an operator with a view of a scene, otherwise obstructed by an obstruction movably supported by a vehicle, by replacing those portions of an image depicting the obstruction and captured by a first view obstructed camera with corresponding portions captured by second unobstructed camera. In some implementations, those portions captured by the second unobstructed camera are perspectively/geometrically transformed prior to replacing those portions of the obstructed image that depict the obstruction.

For purposes of this disclosure, the phrase "perspectively transformed" or "perspective transformation" refers to geometric transformation, wherein at least portions of an image or its pixels captured from a first perspective or at a first angle by a camera or geometrically transformed so as to appear as to have been captured from a second different perspective or a second different angle by a camera. One example image processing method or technique for performing such perspective/geometric transformation is OpenCV in Python. In some implementations, those portions captured by the unobstructed camera are perspectively transformed/geometrically transformed so as to appear to have been captured at the angle or perspective of the first obstructed camera. As result, the modified first image, captured by the obstructed camera and including those geometrically transformed portions of the second image from the unobstructed camera, may be more realistic.

In some implementations, perspective transformation may be performed using multiple homography approaches. With such approaches, a series of transformations are applied to an image to change its perspective. Homography is a concept in computer vision that relates to the projective transformation of planes, allowing the representation of an image taken from one perspective to be transformed into an image from another perspective.

By using multiple homographies, a controller or its image processing may cater to different parts of an image that may require distinct transformation matrices due to varying depths or planes within the image. This can be especially useful in complex scenes where a single homography transformation might not be sufficient to achieve the desired perspective change across the entire image. The implementation of multiple homographies can be more complex but allows for a more refined and accurate perspective transformation.

In some implementations, the first view obstructed camera is an upper camera supported by the vehicle at a height above the height of the operator when residing on the vehicle. The second unobstructed camera is a camera supported by the vehicle at a height below the height of the operator when residing on the vehicle. In some implementations, the second unobstructed camera may be supported by the vehicle at a height below the feet of the operator when residing on the vehicle. In some implementations, the second view unobstructed camera may be supported by the vehicle at a height below the rotational axes of the wheels of the vehicle. In some implement the first view obstructed camera is a lower camera while the second camera is an upper camera, a camera above the lower camera.

In some implementations, the first portion of the obstructed image, depicting the obstruction and that is to be replaced with a corresponding second portion from the unobstructed image, is automatically determined by controller based upon image segmentation of the image to identify boundaries of the obstruction. In some implementations, a controller may present the first image to the operator on a display screen, wherein the operator manually demarcates or defines the first portion of the first image to be replaced on the same display screen. For example, the operator may, with a touchscreen, manually draw the outline of the first portion of the first image to be replaced with his or her finger or a stylus. The operator may, with a mouse, drag a cursor to outline the first portion of the first (obstructed) image to be replaced. With a mouse, keyboard or pointer the operator may identify the corners of a polygonal first portion of the obstructed image to be replaced.

In some implementations, the first portion of the obstructed image being replaced may have two-dimensional size and shape corresponding to the two-dimensional size and shape of the obstruction in the first image. Said another way, the outline of the first portion being replaced corresponds to the outline of the obstruction. In some implementations, the first portion of the obstructed image being replaced may have a two-dimensional size and shape smaller than the two-dimensional size and shape of the obstruction. In some implementations, the first portion of the obstructed image being replaced may be entirely contained within the two-dimensional view of the obstruction in the first image. In some implementations, the first portion being replaced may be larger than the two-dimensional size and shape of the obstruction. Said another way, the first portion being replaced may extend beyond edges of the obstruction in one or more directions.

In some implementations, the first portion of the obstructed image, depicting the obstruction and that is to be replaced with a corresponding second portion from the unobstructed image, is automatically determined by a determined height at which the obstruction is supported by the vehicle and generic obstruction specifications retrieved by the vehicle. The generic obstruction specifications identify different predetermined dimensions (maximum height and maximum width) for different types of obstructions. The controller may receive input from an operator identifying the type of obstruction (harvester head type, blade type, bucket type, round bale, square bale, pallet load etc.), or may determine the type of obstruction from the first image. From this information, the controller may retrieve the particular specifications for the particular type of instruction and use such information to determine what portions of the first image depict the obstruction and what portions of the first image are to be replaced with portions from the second image.

In some implementations, the size of the obstruction, that may serve as a basis for the size of the first portion of the obstructed image to be replaced, may be estimated based upon an input or sensed weight of the load carried by the load carrying tool of the vehicle. In those circumstances where the load carried by the load carrying tool extends outwardly or upwardly beyond the load carrying tool and forms part of the obstruction, the size of the load may be estimated from the weight of the load. The estimated size of the load may be used as a basis for estimating the size of the obstruction and determining the first portion of the instructed image to be replaced. For example, vehicles may sometimes be utilized to lift and carry round or square bales of hay. Based upon the weight of such bales, the size of such bales may be estimated and used to determine the dimensions or configuration of the first portion of the obstructed image, the first image, that is to be replaced with corresponding portions from the unobstructed second image.

In some implementations, the configuration (size and shape) of the first portion being replaced may change in response to the height of the obstruction. In some implementations, as the vehicle moves its load carrying tool and supported load to different vertical heights, different obstructed first images are presented on display. The different obstructed first images may each have a first portion replaced with a corresponding (size and shape) second portion from the unobstructed second image. However, at least two of the obstructed first images presented on the display may have differently configured replaced first portions. For example, when the obstruction (tool and load) is supported at a first height, the replaced first portion of the first image of the obstruction at the first height may have a first size and when the load is supported at a second height, different than the first height, the replaced first portion of the first image of the obstruction at the second height may have a second size different than the first size.

In some implementations, the operator may prescribe the different sizes and shapes for the first replaced portions of the respective obstructed images depicting different heights of the load carrying tool or obstruction. For example, in some implementations, during a setup phase, the operator may be requested to control the vehicle so as to move the load/obstruction through a range of positions where the load/obstruction impedes his or her view. At each of such positions, the operator may be presented with an obstructed image depicting the obstruction, wherein for each of such positions, the operator may be prompted to demarcate or define (as described above) the particular size and/or shape of the first portion of the obstructed image to be replaced with the correspondingly sized and/or shaped second portion from the unobstructed image.

In some implementations, rather than replacing the first portion of a first image depicting an obstruction with a corresponding second portion of a second image depicting the scene that was blocked by the obstruction, the example vehicle vision systems, methods and mediums may project or otherwise display the second portion from the second camera, corresponding to the scene that is being blocked by the obstruction, onto or on a transparent medium between the operator and the actual obstruction. Such implementations provide an augmented reality where the operator may view, with the same line of sight, the real world, including the obstruction surroundings, and possibly portions of the obstruction, while also viewing the scene blocked by the obstruction on the transparent medium in front of the obstruction. In some implementations the transparent medium may be provided as part of a windshield or operator cab window. In some implementations, the transparent medium may be provided by a pair of glasses worn by the operator.

In some implementations, the second portion captured by the unobstructed second camera and displayed on the transparent medium is opaque while extending directly in front of the real-world obstruction (between the operator and the real-world physical obstruction), blocking viewing of at least portions of the real-world, physical obstruction. In some implementations, the second portion captured by the unobstructed second camera and displayed on the transparent medium directly between the operator and the real-world, physical obstruction (in contrast to a digital depiction of the obstruction) is at least partially translucent such that the operator may see the otherwise obstructed scene on the transparent medium while viewing the real-world, physical obstruction through the translucent scene displayed on the transparent medium.

In some implementations, the example systems, methods and mediums generate a new image depicting the scene, from the perspective of the first camera using a machine learning network. The new image is displayed to the operator, either on a display screen or on a transparent medium as described above. As with the above-described systems, the example systems comprise a vehicle configured to movably support an obstruction blocking an operator's view of a scene. A first camera is mounted to the vehicle to capture a lower image of the scene beyond the obstruction. A second camera is mounted to the vehicle to capture an obstructed upper image depicting the obstruction.

The machine learning network may comprise a generator and a discriminator. The generator differently combines or morphs the first image and the second image to form different candidate composite images. The discriminator performs an evaluation of the different candidate morphed images based upon training. Such training is based upon multiple sets of images, each set of images comprising (1) an obstructed first image of a scene captured by a first camera (corresponding to the first image described above), (2) a second image captured by a second camera and depicting the scene unobstructed by the obstruction in the first image, and (3) a third image captured by the first camera without the obstruction. The first and second or the second and third images may be captured at the same time. Each of the first, second and third images are taken with the vehicle at the same geographic position. The machine learning network utilizes the third image as a basis for evaluating various candidate combinations of the first and second images. In such a manner, the discriminator of the machine learning network learns how to evaluate various combinations of the first and second images (morphed images) later captured by the first and second cameras without the third image, wherein the discriminator may use its training to select a particular combination of the first and second images (a particular morphed image) that best matches reality. The selected morphed image may be displayed to the operator on a display screen or on a transparent medium as described above. Use of the machine learning network and the above training images may achieve more realistic morphed images, providing an operator with a desired view any desired perspective of a scene that might otherwise be blocked by the obstruction carried by the vehicle.

In some implementations, the example vehicle vision systems, methods and mediums determine positioning of the potential obstruction, whether the potential obstruction is in a raised operator vision obstructing position based upon signals from a non-image sensor. In some implementations, the non-image sensor comprises a potentiometer or other sensor configured to detect an angle of the pair of arms supporting the obstruction. In some implementations, the nonimage sensor comprises a hydraulic fluid pressure sensor, wherein the positioning of the arms and the corresponding height of the load carrying tool (and its load) may be determined based upon corresponding sensed levels of hydraulic pressure in the hydraulic lift cylinders (cylinder-piston assemblies) positioning and supporting the bucket. In some implementations, the positioning of the obstruction may be determined based upon a combination of signals from the non-image sensor and at least one of the upper and lower cameras supported by the vehicle.

In some implementations, the examples automatically replace pixels of the obstruction with geometrically transformed pixels from the image from the lower forwardly facing camera in response to a determination that the obstruction is at or above a predetermined height or angle threshold. Such a threshold may vary depending upon the type or size of the obstruction. In some implementations, the predetermined height or angle threshold varies depending upon the type or size of load carrying tool currently mounted or attached to the vehicle. In some implementations, the examples automatically identify the size or type of bucket or other load carrying tool currently mounted based upon images from at least one of the upper and lower cameras, or in a trained neural network that identifies the load carrying tool currently attached and wherein the controller selects the particular image transforming height or angle threshold for the particular load carrying tool. For example, the controller may consult a lookup table storing different height or angle thresholds for different types or sizes of buckets or other load carrying tools.

In some implementations, the vehicle may include an operator input by which an operator identifies or selects the type or size of tool currently mounted and used by the vehicle. In such implementations, the controller may use the identification of the bucket or other tool to select from amongst several image transforming height or angle thresholds.

In some implementations, each of the different types of buckets or other tools may include an identifier mounted to or carried by the particular tool. The identifier may be in the form of a visible lead readable code, such as a barcode or QPR code, wherein the upper camera the lower camera captures an image of the code and wherein the controller determines the type and size, or size of the load carrying tool based upon the read code. Once the tool has been identified, the controller may apply the image transforming height or angle threshold based upon the identified bucket or other load carrying tool.

In some implementations, the identifier may comprise a wireless sensor tag configured to transmit a signal or to be read by corresponding reader scanner on the vehicle. For example, the identifier may comprise a radiofrequency identifier (RFID) tag mounted to the bucket or other tool. The RFID tag may indicate the type and such or size of the bucket or other tool to the controller, wherein the controller then applies the appropriate image transforming height or angle threshold based upon the identification.

In some implementations, the examples provide the operator with an opportunity to adjust the image transforming height or angle threshold. For example, a shorter operator may wish to lower the threshold at which the examples begin to replace pixels of the obstruction in the image from the upper camera with perspectively transformed pixels of regions beyond the obstruction from the image from the lower camera. Conversely, a taller operator may wish to raise the threshold at which the examples begin to replace pixels of the obstruction in the image from the upper camera with perspectively transformed pixels of regions beyond the obstruction from the image from the lower camera. In some implementations, the transparent window resulting from the replaced pixels may be raised or lowered by an operator using an operator interface, such as a mouse, touchscreen and the like to raise or lower the transparent window in real time on the screen.

For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

For purposes of this disclosure, unless otherwise explicitly set forth, the recitation of a "processor", "processing unit" and "processing resource" in the specification, independent claims or dependent claims shall mean at least one processor or at least one processing unit. The at least one processor or processing unit may comprise multiple individual processors or processing units at a single location or distributed across multiple locations.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the phrase "configured to" denotes an actual state of configuration that fundamentally ties the stated function/use to the physical characteristics of the feature proceeding the phrase "configured to".

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

FIG. 1 is a diagram schematically illustrating portions of an example vehicle vision system 20. Vehicle vision system 20 facilitates viewing of an otherwise obstructed scene by an operator. Vehicle vision system 20 comprises vehicle 24, cameras 32, 34, and controller 40.

Vehicle 24 comprises a self-propelled vehicle configured to movably support an obstruction 27 (schematically illustrated by a box). The obstruction 27 comprises one or more objects that, in certain positions supported by the vehicle 24, block the view of a scene 35 (Sc, schematically illustrated with a diamond), by an operator 37. As shown by FIG. 1 and indicated by arrow 41, the view of the operator 37 being blocked may be a direct view of the scene 35 such as when the operator 37 is residing on vehicle 24 and is viewing the scene 35 through an opening or transparent window pane/windshield of vehicle 24. In some circumstances, the operator's view of the scene 35 may be indirect through the viewing of images of scene 35 captured by camera 32 and presented on display 44.

As shown by broken lines in FIG. 1, in some implementations, the operator 37 may be at a remote location 43, wherein the operator 37 is able to view scene 35 indirectly, by viewing a display 44 provided at the remote location 43, wherein the display 44 presents images captured by camera 32. The images captured by camera 32 may be wirelessly transmitted via wireless transceiver 46 provided on vehicle 24, wherein the transmitter 46 communicates with a remote controller 48. The scene 35 may be a particular structure, landmark, person, animal, implement or vehicle to the front of vehicle 24 or to the rear of vehicle 24. The scene 35 may comprise a general unspecific portion of a panorama forward of vehicle 24 or rearward of vehicle 24.

The operator's view of the scene 35 may enhance the operator's ability to control the steering and/or speed of vehicle 24 and/or to control the specific height of the functional tool or load carried by vehicle 24 using an operator interface (accelerator pedal, steering wheel, shift lever, throttle, joystick, touch, touchpad, microphone with speech recognition, camera with optical recognition, and the like). For example, the operator's view of the scene 35 may assist the operator in controlling vehicle 24 so as to avoid particular physical obstacles contained in the scene 35. The operator's view of the scene 35 may assist the operator controlling vehicle 24 to drive vehicle 24 so as to engage a particular physical object or material contained in scene 35. For example, the scene 35 may comprise a pile or stack material for which the vehicle 24 is to scoop or grab. The scene 35 may comprise a rack from which a load is to be withdrawn or onto which a load is to be discharged. The scene 35 may comprise a trailer, a wagon, a dump truck, or a container onto which or into which a load carried by the vehicle is to be discharged. The scene 35 may comprise a trailer onto which the functional tool (harvester head, blade, bucket or the like) of the vehicle is to be loaded. The scene 35 may comprise an implement, attachment or other vehicle to which the vehicle 24 is to connect.

The obstruction 27 may comprise a functional tool of vehicle 24. Examples of functions are described above. The functional tool may comprise a harvester head, a blade, an auger, or other component that is movable to a height by the vehicle which obstructs (partially or completely) an operator's view of scene 35 by at least partially blocking the operator's line of sight to scene 35 or the field-of-view of camera 32. The functional tool may comprise a load lifting tool such as a bucket or a fork use to engage a pallet, a platform, or a mass of material such as a bale. The obstruction 27 may comprise the load itself being carried by the load carrying tool. In some circumstances, the load carrying tool is not part of the obstruction extends beyond the load carrying tool so as to form the obstruction 27.

Camera 32 comprises an upper camera supported by vehicle 24 above camera 34. In implementations where the operator 37 is to reside on vehicle 24, camera 32 may be at a height above the head of operator 37. Camera 32 has a field-of-view 51 that contains scene 35 when not obstructed by obstruction 27. Camera 32 may be supported by vehicle 24 so as to face in a downward angle. Camera 32 may comprise a two-dimensional camera or a stereo/three-dimensional camera. Camera 32 may capture individual images or a series of images which may form a video.

Camera 34 comprises a lower camera supported by vehicle 24 at a height below camera 32. Camera 34 has a field-of-view 53 that contains scene 35 when not obstructed by obstruction 27. In implementations where the operator is to reside on vehicle 24, camera 34 may be at a height below the head of the operator 37 and, in some implementations, below the feet of the operator. In some implementations, camera 34 may be supported at a height below lifting arms 26 that support the functional tool and which are actuated to raise and lower the functional tool. In some implementations, camera 34 may be supported by vehicle 24 so as to face in an upward angle relative to horizontal. As with a camera 32, camera 34 may comprise a two-dimensional camera or a second camera 34 may capture individual images or a series of images which may form a video.

In some implementations, one or both of cameras 32 and 34 is pivotable or tilting to different angles relative to horizontal. In some implementations, vehicle 24 may comprise a powered actuator 37 such that electric solenoid, stepper motor or the like operably coupled to camera 34 to controllably pivot and orient camera 34 relative to the horizontal. In such implementations, controller 40 may control the orientation of camera 34 to facilitate the capture of an unobstructed image of scene 35 when obstruction 27 is present. For example, upon determining the position and nature or size of obstruction 27, as described hereafter, controller 40 may automatically output control signals to the actuator 37 to reorient camera 34. In some implementations, vehicle 24 may additionally or alternatively comprise a similar powered actuator operably coupled to camera 32 to controllably pivot and orient camera 32 relative to the horizontal. For example, upon determining the position and nature or size of obstruction 27, controller 40 may automatically output control signals to the actuator to reorient camera 32 to capture an unobstructed image of scene 35 or an image having a reduced or a minimal degree of obstruction by obstruction 27. By reducing the degree to which obstruction 27 obstructs the field-of-view of camera 32, controller 40 may reduce the size of the first portion of an image captured by camera 32 that is to be replaced with corresponding second portion of the image captured by camera 34.

Operator interface 36 comprises a devices or component of vehicle 24 that is configured to present a viewing image for the operator of vehicle 24. Operator interface 36 may comprise a monitor or display 44 viewable by the operator residing on vehicle 24 or at a remote location 43. In some implementations, operator interface 36 may be additionally configured to receive commands or input from the operator. For example, display 44 may comprise a touchscreen. In some implementations, operator interfaces 236 may comprise a display monitor and a separate input device such as a mouse, keyboard, joystick or the like.

Controller 40 provides operator 37 with an unobstructed view of scene 35 on display 44. Controller 40 comprises processor 56 and memory 58. Processor 56 comprises a processing unit configured to carry out computations or analysis, to poll various sensors, to prompt an operator for input or information, to retrieve information from remote sources and/or to output control signals for controlling the positioning of the functional tool and the potential obstruction 27 by vehicle 24. Memory 58 comprises a non-transitory computer-readable medium containing instructions for directing processor 56 to carry out the aforementioned tasks. In the example illustrated, memory 58 comprises instructions configured to direct processor 56 to carry out the example vehicle vision method 100 shown in FIG. 2.

Figure 2:
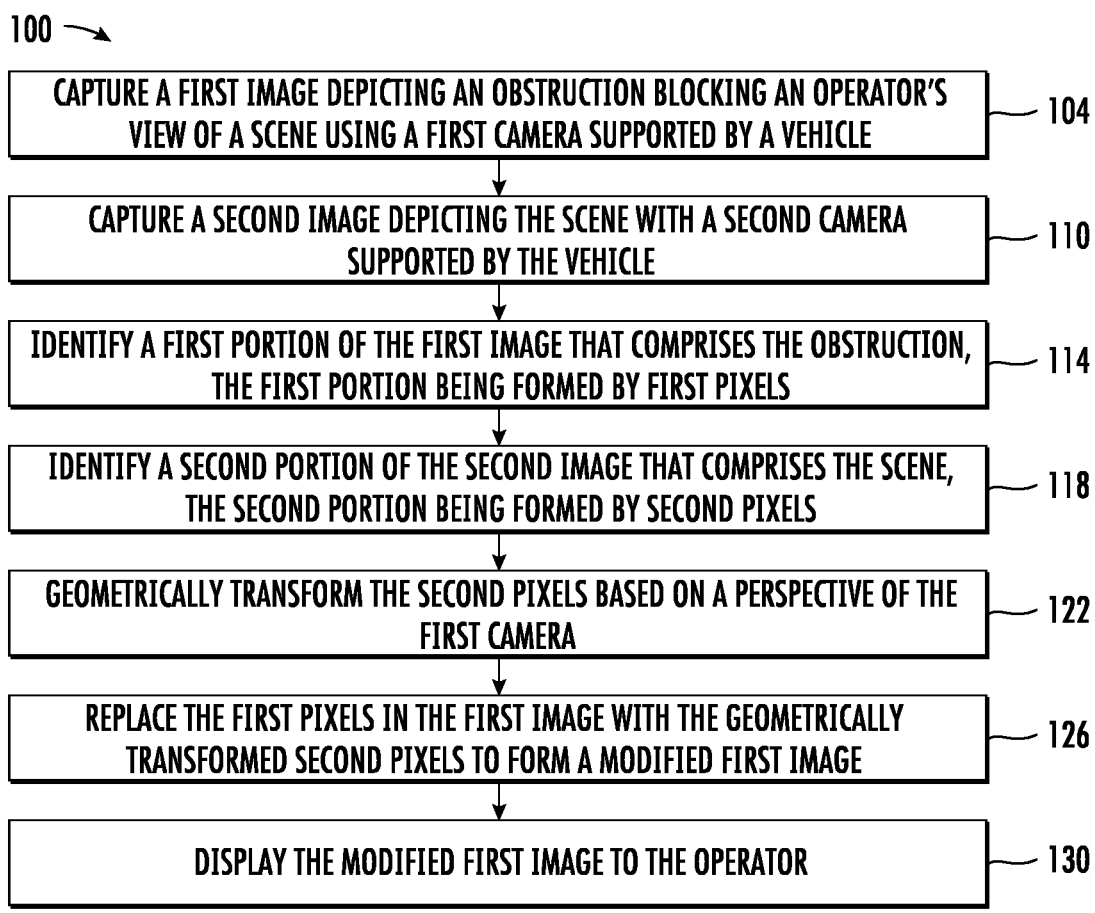
FIG. 2 is a flow diagram of an example vehicle vision method.

As indicated by block 104 in FIG. 2, controller 40 directs camera 32 to capture a first image 106 (shown in FIG. 1) depicting an obstruction blocking an operator's view of scene 35. As further shown by FIGS. 1 and 3, this depiction 107 of scene 35 in the image is partially obstructed by obstruction 27. Image 106 comprises the depiction 108 of obstruction 27.

As indicated by block 110 of FIG. 2, controller 40 directs camera 34 to capture a second image 111 comprising an unobstructed depiction 107 of scene of scene 35. FIG. 4 is a front view of image 111 providing a depiction 107 of scene 35. In some implementations, controller 40 directs camera 34 to capture the second image 111 concurrent with the capture of image 106 by camera 32. In some implementations, the capture of images 106 and 111 may not necessarily be concurrent, but occur without intervening movement of vehicle 24 or obstruction 27.

As indicated by block 114 in FIG. 2, controller 40 identifies a first portion 115 of image 106 that comprises the obstruction (the depiction 108 of the obstruction 27), the first portion 115 comprising first pixels. In the example shown in FIG. 3, the first portion has a size and shape coinciding with or matching the size and shape of the depiction 108 of obstruction 35. As discussed above, in other implementations, the first portion 115 may contain the depiction 108, but may be larger or smaller than the depiction 108.

As indicated by block 118 in FIG. 2, controller 40 identifies a second portion 119 comprising the depiction 107 of the scene 35. This second portion 119 is formed by second pixels and has a size and shape corresponding to the size and shape of the first portion 115. As shown by FIGS. 5 and 6, images 106 and 111 captured by cameras 32 and 34 have different perspectives or differently angled image planes due to their different points of view with respect to scene 35. In some implementations, the different image planes may be due in part to the different angles at which cameras 32 and 34 are supported.

As indicated by block 122 in FIG. 2, controller 40 performs a perspective transformation, a geometric transformation, of image 111 or at least the second pixels 119. As schematically represented by arrows 123 in FIG. 6 and as shown by FIG. 7, the pixels of second portion 119 (and the entire image 111 in the example) are rotated to form a modified image 111' having a geometrically transformed second portion 119' that extend in a modified image plane that extends at an angle (relative to horizontal) closer to or matching the angle of the image plane of image 106. One example technique for performing such geometric transformation may be performed with the open sourced OpenCV in Python. In other implementations, other techniques or computing programs/resources may be utilized to perform such geometric/perspective transformation.

As indicated by block 126 in FIG. 2 and shown in FIG. 8, controller 40 replaces the first pixels of the first portion 115 in image 106 with the geometrically transformed pixels of second portion 119' to form a modified first image 106'. In some implementations, the pixels of the second portion 119' are overlaid on top of or in front of the first portion 115 in image 106. In some implementations, the pixels of the first portion 15 is effectively cut or removed and replaced with the pixels of the geometrically transform second portion 119'. The boundaries between the geometrically transform second portion 119' in the remainder of image 106 may be stitched or blended to provide a smooth transition. In other implementations, the border may be demarcated to visibly distinguish portion 119' from the remainder of the original image 106. Because the second portion 119' is geometrically transformed prior to replacing the first portion 15 of image 106, the resulting modified first image 106' may be more realistic.

As indicated by block 130 in FIG. 2, the modified first image 106' is displayed to the operator 37. The modified first image 106' may be displayed on display 44. The operator may use the improved view of scene 35 to better control of vehicle 24 using operator interface 36. As described above, the operator 37 may better position the functional tool of vehicle 24 relative to vehicle 24 or may better position vehicle 24 itself.

In the example illustrated, the second portion 119 is geometrically transformed to be closer to or to match the angle of the image plane of image 106. The modified first image 106' has an image plane with the same angle as that of the original first image 106. As shown by FIG. 1, in other implementations, both of images 106 and 111 may be geometrically transformed to the same perspective or image plane angle, but different than that of both images 106 and 111. For example, in some implementations, at least the first portion 115 and second portion 19 may both geometrically transformed such that the geometrically transformed image planes of both of images 106 and 111 extend in a plane substantially perpendicular to the line of sight 41 of operator 37 or in a plane substantially parallel to vertical. Once the pixels of both of such images or portions 115, 119 have been geometrically transformed, the geometrically transformed pixels of the second portion 119" may be used to replace the geometrically transformed pixels of the geometrically transformed first portion 115", producing a modified image 106" having an image plane that is parallel to vertical.

Figure 9:
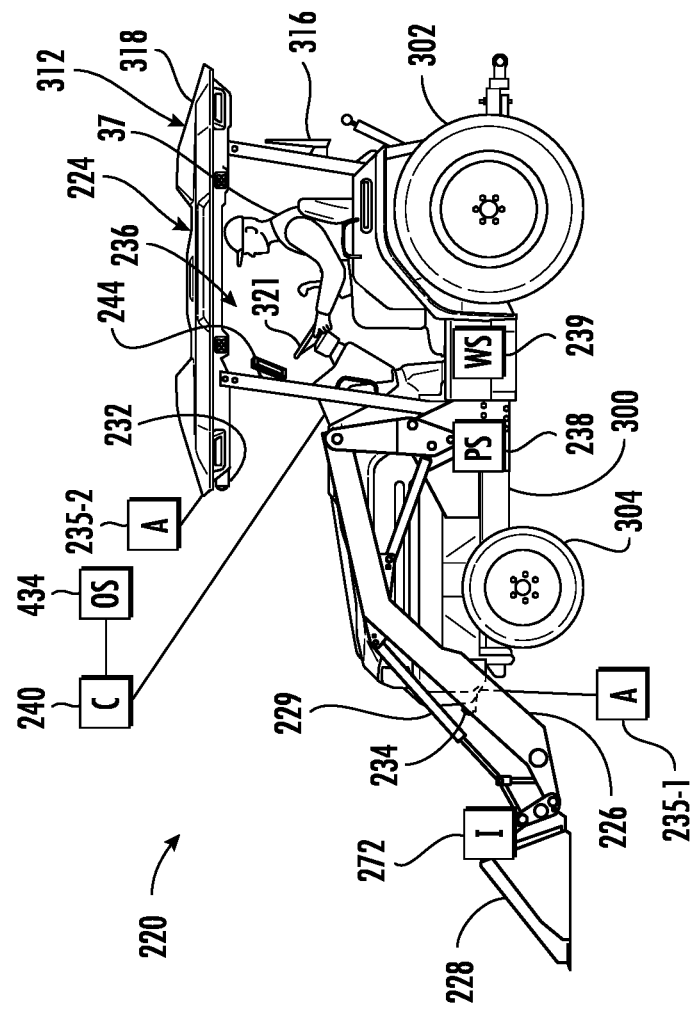
FIG. 9 is a perspective view of an example vehicle vision system with an example load carrying tool in a lowered position.
Figure 9:
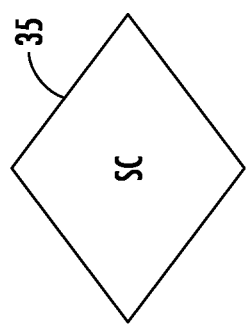
Figure 10:
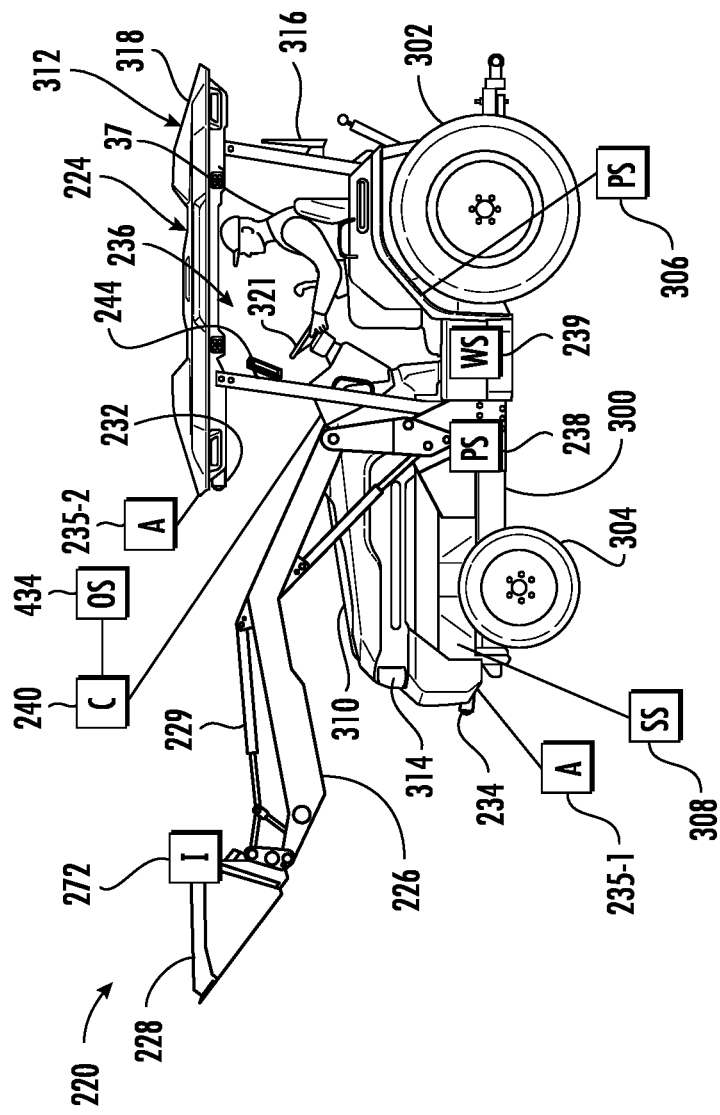
FIG. 10 is a perspective view of the example vehicle vision system of FIG. 9 with the example load carrying tool in a raised view obstructing position.
Figure 10:
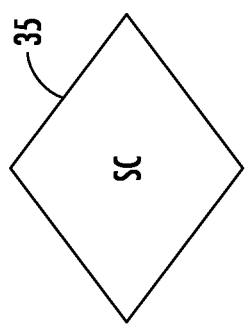

FIGS. 9 and 10 illustrate portions of an example vehicle vision system 220. Vision system 220 is one example implementation of vision system 20 described above. Vision system 220 comprises vehicle 224, upper camera 232, lower camera 234, operator interfaces 236, position sensor 238, weight sensor 239, tool identifier 272 and controller 240.

Vehicle 224 is the form of a loader having a lift arms 226 supporting a load carrying tool 228 in the form of a bucket. Lift arms 226 pivotably support load carrying tool 228 between a lowered position shown in FIG. 9 and a raised position shown in FIG. 10. In the example illustrated, the load carrying tool 228 may block the view of a scene 35 by operator 37. In the example illustrated, vehicle 224 is in the form of a tractor having hydraulic actuators 229 (in the form of hydraulic jacks or cylinder-piston assemblies) for raising and lowering lift arms 226 and for adjusting the orientation of load carrying tool 228 relative to lift arms 226.

In addition to lift arms 226, load carrying tool 228 and jacks 229, vehicle 224 further comprises chassis or frame 300, rear wheels 302, front wheels 304, propulsion system 306 and steering system 308 (both of which are schematically shown in FIG. 10). Frame 300 supports the remaining components of vehicle 224. In the example illustrated, frame 300 comprises a front hood portion 310 and an operator cab 312. Front hood portion 310 projects forwardly of operator cab 312 between front wheels 304. Front hood portion 310 houses components of propulsion system 306 and steering system 308. Front hood portion 310 may support front hood lights 314 for vehicle 224. In some implementations, front hood portion 310 may include internal cavity for receiving a removable battery which electrically powers an electrical motor, both of which are part of propulsion system 306. In some implementations, front hood portion 310 may house an internal combustion engine which is part of propulsion system 306.

Operator cab 312 is generally located between rear wheels 302 and comprises a seat 316 for operator 37 and an overhead roof 318. Roof 318 may support a wireless transceiver, inertial measurement units and/or a global positioning satellite (GPS) system receiver. Roof 318 may further support forward, rearward and sideways facing lights. In some implementations, operator roof 318 or operator cab 312 may be omitted, such as where vehicle 224 is remotely driven or controlled from a remote station, such as station 43 shown in FIG. 1.

Rear wheels 302 support a rear of frame 300 and are operably coupled to propulsion system 306. Front wheels 304 support a front of frame 300 and underlie front hood portion 310. Front wheels 304 are operably coupled to steering system 308. In some implementations, one or both wheels 302, 304 may alternatively comprise tracks.

Propulsion system 306 propels or drives vehicle 224 by supplying torque to rear wheels 302. In some implementations, propulsion system 306 may additionally supply torque to front wheels 304. Propulsion system 306 may comprise a transmission for transmitting torque to at least rear wheels 302, wherein the transmission may facilitate operator selection of a multitude of different speeds and/or torque outputs to rear wheels 302. In some implementations, propulsion system 306 may comprise a battery which supplies electrical power to an electrical motor, wherein the electrical motor supplies torque to rear wheels 302. The electric motor may further supply torque to power a hydraulic pump for driving a hydraulic motor which may supply torque to front wheels 304. In some implementations, propulsion system 306 may comprise an internal combustion engine.

Steering system 308 facilitates steering of vehicle 224. Steering system 308 may comprise a steering wheel 321 or another steering input device, wherein operator manipulation of the steering input device results in wheels 304 being turned. In some implementations, steering system 308 may comprise a steer by wire system, wherein operator manipulation of the steering input device 321 results in the output of control signals which cause an actuator (hydraulic jack, electric solenoid or the like) to actuate steering gears (such as rack and pinion steering gears) that controllably turn front wheels 304. In some implementations, steering system 308 may instead utilize a steering linkage. In some implementations, steering system 308 may comprise a hydrostatic or hydraulic power steering system. In other implementations, steering system 308 may have other configurations. In some implementations, vehicle 224 may have other forms and may have other steering systems such as where vehicle 224 is steered by driving the left and right rear wheels 302 at different speeds (a hydrostatic steering system).

Upper camera 232 is similar to upper camera 32 described above. Upper camera 232 is supported on a forwardly facing front portion of roof 318. Upper camera 232 may be at a height above the head of operator 37. Camera 232 has a field-of-view that contains scene 35 when not obstructed by an obstruction. Camera 232 may be supported by vehicle 224 so as to face in a downward angle. Camera 232 may comprise a two-dimensional camera or a stereo/three-dimensional camera. Camera 232 may capture individual images or a series of images which may form a video.

Lower camera 234 comprises a lower camera supported by vehicle 224 at a height below camera 232. Camera 234 has a field-of-view 3 that contains scene 35 when not obstructed by an obstruction. In implementations where the operator is to reside on vehicle 224, camera 234 may be at a height below the head of the operator 37 and, in some implementations, below the feet of the operator. In some implementations, camera 234 may be supported at a height below the location at which lifting arms 226 are connected to frame 300. In some implementations, camera 234 may be supported by vehicle 224 so as to face in an upward angle relative to horizontal. As with a camera 232, camera 234 may comprise a two-dimensional camera or a second camera 34 may capture individual images or a series of images which may form a video.

In some implementations, one or both of cameras 232 and 234 is pivotable or tilting to different angles relative to horizontal. In some implementations, vehicle 224 may comprise a powered actuator 235-1 (schematically illustrate), such as an electric solenoid, stepper motor or the like, operably coupled to camera 234 to controllably pivot and orient camera 234 relative to the horizontal. In such implementations, controller 240 may control the orientation of camera 234 to facilitate the capture of an unobstructed image of scene 35 when an obstruction is present. For example, upon determining the position and nature or size of an obstruction, as described hereafter, controller 240 may automatically output control signals to the actuator to reorient camera 234.

In some implementations, vehicle 224 may additionally or alternatively comprise a similar powered actuator 235-2 operably coupled to camera 232 to controllably pivot and orient camera 232 relative to the horizontal. For example, upon determining the position and nature or size of an obstruction, controller 240 may automatically output control signals to the actuator to reorient camera 232 to capture an unobstructed image of scene 35 or an image having a reduced or a minimal degree of obstruction by the obstruction. By reducing the degree to which the obstruction obstructs the field-of-view of camera 232, controller 240 may reduce the size of the first portion of an image captured by camera 232 that is to be replaced with corresponding second portion of the image captured by camera 234.

Operator interfaces 236 comprise devices or components of vehicle 824 that are configured to provide information to operator 37 and receive commands or inputs from operator 37. Operator interface 236 may comprise a monitor or display 244 viewable by the operator residing on vehicle 224 or at a remote location. In some implementations, operator interface 236 may be additionally configured to receive commands or input from the operator. For example, operator interface 244 may comprise a touchscreen. In some implementations, operator interfaces 236 may comprise a display monitor and a separate input device such as a mouse, keyboard, joystick or the like.

Position sensor 238 comprises a sensor that outputs signals to controller 240 indicating the height and/or orientation of load carrying tool 228. In some implementations position sensor 238 senses the angular position of lift arms 226. In some implementations composition sensor 238 comprises a potentiometer that senses the angular position of arms 226 relative to frame 300. In some implementations, sensor 238 comprises one or more light-emitter detectors. In some implementations, sensor 238 comprises a hydraulic pressure sensors that sense the extension of hydraulic jacks 229 which indicates the height of lift arms 226 and/or the orientation of tool 228. In other implementations, position sensor 238 may comprise other forms of a sensor that otherwise indicate or sense the angular positioning or height of lift arm 226 and the angular positioning and/or height of tool 228.

Weight sensor 239 comprise a sensor configured to output signals that may be used by controller 240 to determine the weight of the load currently being carried by tool 228. In some implementations, weight sensor 239 may comprise one or more pressure sensors configured to sense hydraulic pressure with respect to jacks 229, wherein the hydraulic pressure may be used by controller 240 to calculate the weight of the load carried by tool 228. In some implementations, weight sensor 239 may comprise one or more strain gauges which output signals indicating the strain on lift arms 226, such signals correlating to the weight of the load carried by tool 228. In yet other implementations, weight sensor 239 may comprise other forms of sensors configured output signals that indicate, or which may be used by controller 240 to determine, the weight of the load currently being carried by the load carrying tool 228.

Identifier 272 is mounted load carrying tool 228 and is configured to indicate one or more characteristics of the type of load carrying tool 228 to controller 240. Identifier 272 may be in the form of a visible readable code, such as a barcode or QR code, wherein the upper camera 232 or the lower camera 234 captures an image of the code and wherein the controller determines the type and/or size of the load carrying tool 228 based upon the read code and a lookup table.

In some implementations, the identifier 272 may comprise a wireless sensor tag configured to transmit a signal or to be read by corresponding reader scanner on the front vehicle. For example, the identifier may comprise a radiofrequency identifier (RFID) tag mounted to the tool 228. The RFID tag may indicate the type and/or size of the tool 228. Each of multiple types or sizes of tool 228 which may re-removably connectable to lift arms 226 may be provided with different identifiers 272. As result, controller 240 may use such identifiers 272 to determine which of the multiple available different tools 228 are currently releasably connected to lift arm 226 and in used by vehicle 224. In some implementations, identifier 272 may be omitted. For example, in some implementations, controller 240 may determine the type and such or size of tool 228 using optical recognition and image processing on images of tool 228 captured by one or both of cameras 232 and 234.

Controller 240 is similar to controller 40 in that controller 240 comprises processor 56 and memory 58. Memory 58 of controller 240 comprise instructions configured to cause processor 56 to operate in a vision assistance mode, wherein controller 40 performs method 100 as described above. In the example illustrated, controller 240 may initiate the vision assistance mode in response to a command input by operator 37. In some implementations, controller 240 may operate in the vision assistance mode (method 100) automatically upon the identification of an obstruction in an image captured by upper camera 232. For example, controller 240 may perform image processing, wherein controller 240 comprises a machine learning network or neural network configured to identify an obstruction within an image captured by camera 232.

In some implementations, controller 240 may automatically enter or operate in the vision assistance mode in response to the identification of or the presence of a predefined target in the lower image captured by camera 234 or in response to the presence of predefined target in the lower image captured by camera 234 being within a predefined distance from vehicle 224. Controller 240 may comprise a machine learning network or neural network configured to identify particular targets within an image captured by camera 234 and configured to indicate the particular distance between the predefined target and vehicle 224.

Figure 11:
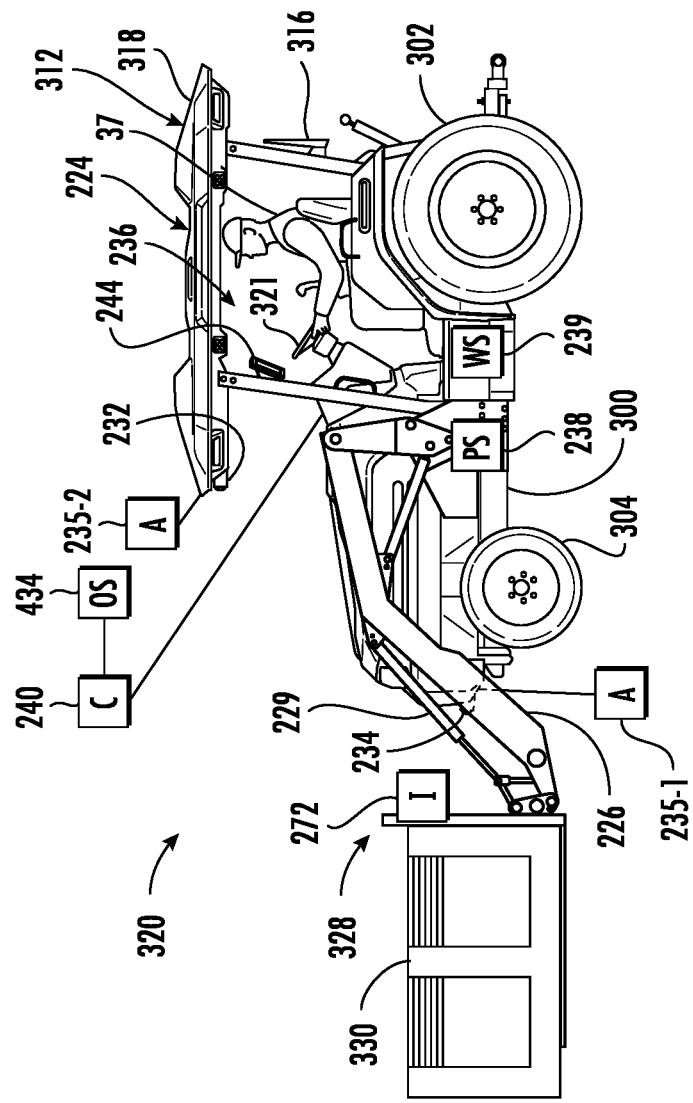
FIG. 11 is a perspective view of an example vehicle vision system with an example load carrying tool in a lowered position.
Figure 11:
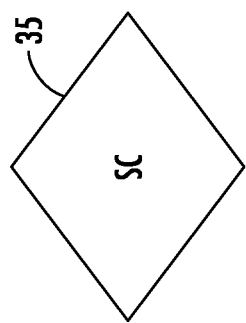
Figure 12:
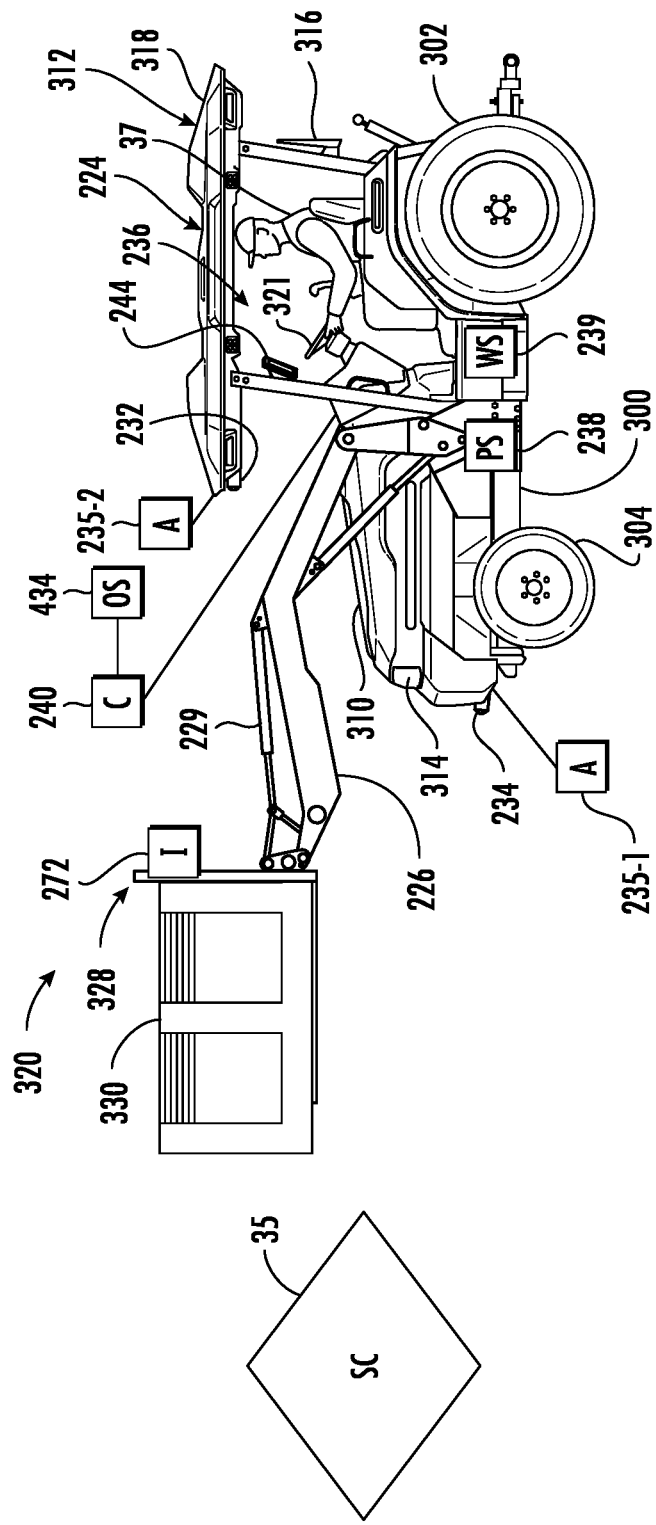
FIG. 12 is a perspective view of the example vehicle vision system of FIG. 11 with the example load carrying tool in a raised view obstructing position.

FIGS. 11 and 12 illustrate portions of an example vehicle vision system 320. System 320 is similar to system 220 described above except that system 320 comprises a load carrying tool 328, in the form of a pallet fork, in place of load carrying tool 228 which was in the form of a bucket. Those remaining components of system 320 which correspond to components of system 220 are numbered similarly.

Load carrying tool 328 is removably and interchangeably mounted to lift arms 226 of the vehicle 224. Load carrying tool 328 comprises two or more forwardly projecting bars or forks configured to extend beneath or into a load that comprises a container 330. In some implementations the load may be in the form of a pallet supporting the rest of the load. In such implementations, the load carrying tool 328 and the pallet may lack sufficient height to form an obstruction to the operator's view of scene 35; however, the remainder of the load supported on top of the pallet or projecting above the container may have a sufficient height so as to obstruct the operator's view of scene 35. As discussed above, controller 240 may enter the vision assistance mode (method 100) in various manners, wherein controller 240 presents to the operator 37 a view of scene 35 from the perspective of upper camera 232 despite the load carrying tool 328 and/or its load otherwise obstructing the view of scene 35 by upper camera 232.

Figure 13:
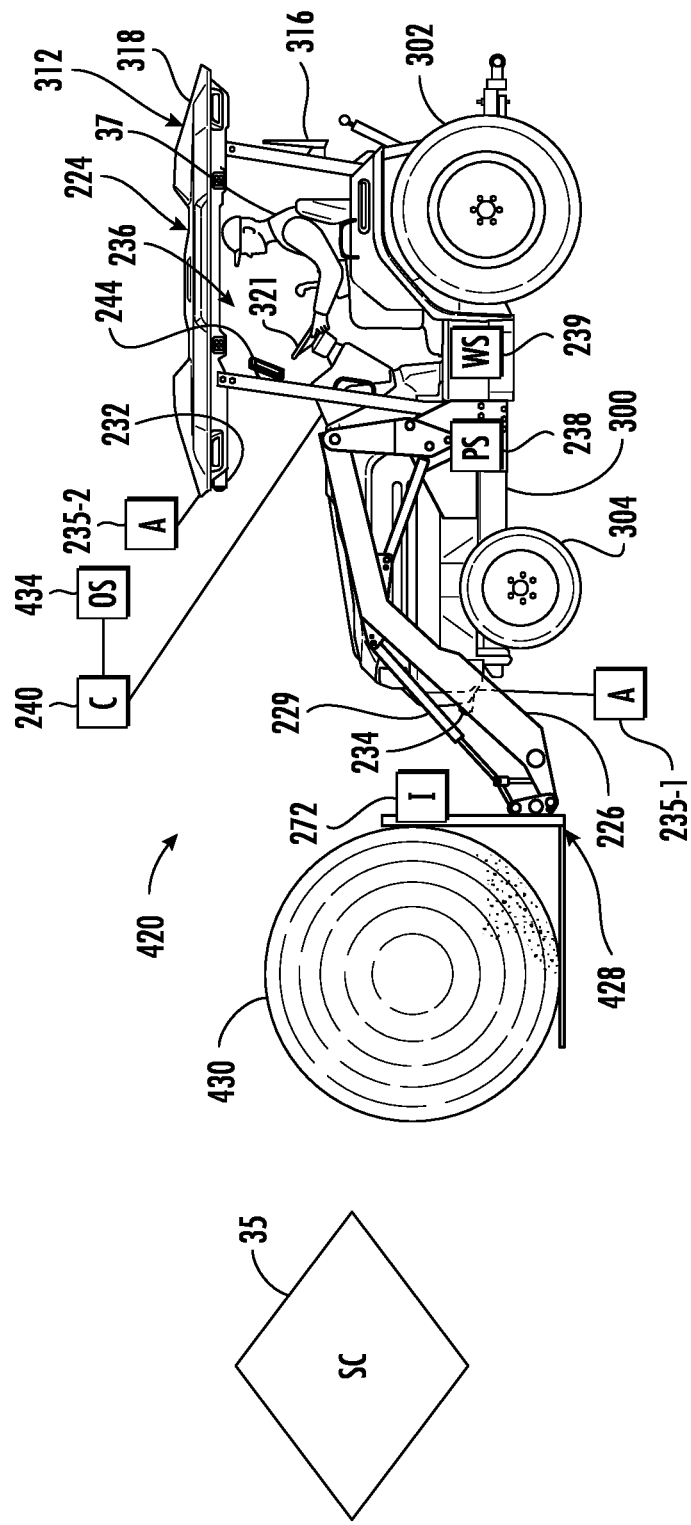
FIG. 13 is a perspective view of an example vehicle vision system with an example load carrying tool in a lowered position.
Figure 14:
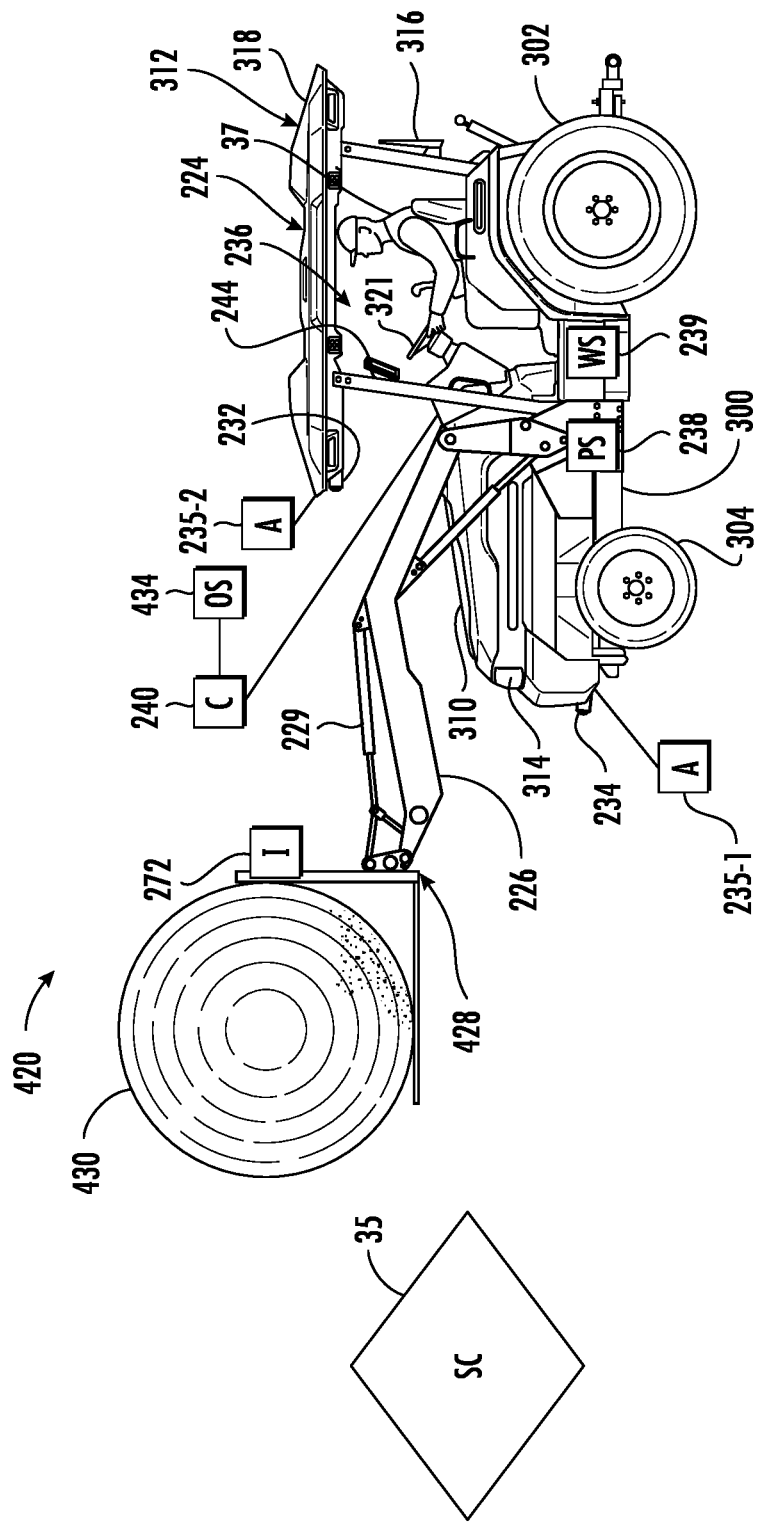
FIG. 14 is a perspective view of the an example vehicle vision system of FIG. 13 with the example load carrying tool in a raised view obstructing position.

FIGS. 13 and 14 illustrate portions of an example vehicle vision system 420. System 420 is similar to system 220 described above except that system 420 comprises a load carrying tool 428, in the form of a bale spear or fork, in place of load carrying tool 228 which was in the form of a bucket. Those remaining components of system 420 which correspond to components of system 220 are numbered similarly.

Load carrying tool 428 is removably and interchangeably mounted to lift arms 226 of the vehicle 224. Load carrying tool 428 comprises two or more forwardly projecting spears or forks configured to extend beneath or into a load 430 that comprises a mass of material, such as a bale of hay. Although illustrated as a square bale, in some implementations, the bale may be a round bale. In some implementations and when supported at particular heights, the load carrying tool 428 may lack sufficient height to form an obstruction to the operator's view of scene 35; however, the remainder of the load projecting above the forks may have a sufficient height so as to obstruct the operator's view of scene 35. As discussed above, controller 240 may enter the vision assistance mode (method 100) in various manners, wherein controller 240 presents to the operator 37 a view of scene 35 from the perspective of upper camera 232 despite the load carrying tool 428 and/or its load otherwise obstructing the view of scene 35 by upper camera 232.

As described above, in performing method 100, controller 240 identifies the first portion of the first image from the first camera, the view obstructed camera 232 (block 114 in FIG. 2), the pixels of which are to be replaced with corresponding geometrically transformed pixels from the second image from the second camera, the view unobstructed camera 234 (block 126 in FIG. 2). Controller 240 may identify the first portion of the first image in one of various operator selectable fashions or selection modes.

In a first example selection mode, where the dimensions of the obstruction largely correspond to the dimensions of the load carrying tool (such as the bucket shown in FIG. 10), controller 240 determines what pixels in the first image comprise the obstruction and are to be replaced based upon the height of lift arms 226 and the orientation of the load carrying tool as well as the dimensions (height) of the load carrying tool. The height of the lift arms 226 may be determined based upon signals from position sensor 238. Such information may indicate lower limits to the first portion to be replaced. The dimensions of the load carrying tool may be predetermined and stored as a value for used by controller 240, may be input by operator 37 using operator interface 236, or may be determined by controller 240. Controller 240 may determine the dimensions (height) of the load carrying tool currently attached to lift arms 226 by identifying the currently attached load carrying tool and consulting a stored database 434 of obstruction specifications which may be in the form of a lookup table providing different dimensions or heights for different types of load carrying tools. Controller 240 may identify the currently attached load carrying tool based upon identifier 272. Controller 240 may identify the currently attached load carrying tool using a trained machine learning network or neural network that is been trained to identify the type of load carrying tool based upon a view obstructed image captured by camera 232. In some implementations, controller 240 may determine the type of the currently attached load carrying tool based upon signals from weight sensor 239. In other implementations, controller 240 may determine the identity of the currently attached load carrying tool in other manners.

In a second example selection mode, where the dimensions of the obstruction may be larger than the dimensions of the load carrying tool, controller 240 may determine what pixels in the first image comprise the obstruction and are to be replaced based upon the height of lift arms 226, the orientation of the load carrying tool and an estimated size of the load carried by the load carrying tool. As described above, the height of the lift arms 226 may be determined based upon signals from position sensor 238. Such information may indicate lower limits to the first portion to be replaced. The dimensions of the load carrying tool may be predetermined and stored as a value for used by controller 240, may be input by operator 37 using operator interface 236, or may be determined by controller 240.

Controller 240 may determine the dimensions (height) of the load based upon an input height of the load as provided by operator 37. Controller 240 may also determine the height of the load currently carried by the load carrying tool by identifying the type or weight of the load and consulting a stored database 434 of obstruction specifications which may be in the form of a lookup table providing different dimensions (widths and heights) for different types of loads or different weights of different types of loads. For example, an operator may indicate that the load comprises a square bale of straw. Given this information and the weight of the bale, controller 240 may estimate the height of the bale to determine dimensions for the first portion of the first image to be replaced. A bale of cornstalks or a bale of alfalfa with a particular moisture value may have different dimensions as compared to a bale of straw having the same weight. Such dimensions may be different also for a round bale versus a square bale. As discussed above, the location of the first portion in the first image may be determined based upon the determined positioning or height of lift arms 226.

Controller 240 may identify the current load and its height using a trained machine learning network or neural network that is been trained to identify the type of load based upon a view obstructed image captured by camera 232. In some implementations, controller 240 may determine the type of the current load based upon signals from weight sensor 239, wherein the height may be based upon the weight and type of the load (round bale, square bale). In other implementations, controller 240 may determine the view obstructing dimensions of the load in other manners.

Figure 15:
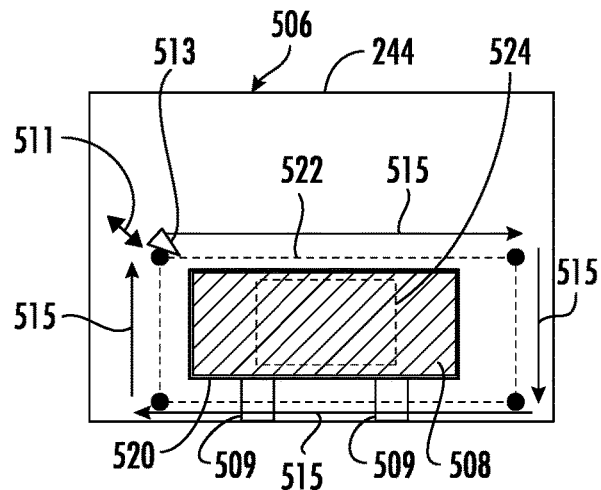
FIG. 15 is a diagram of an example view obstructed image depicting an example obstruction and example operator input outlines of different portions for replacement by corresponding portions from a view unobstructed image.

In a third example selection mode, controller 240 may present the view obstructed image from camera 232 to operator 37 on display 244. FIG. 15 is a diagram illustrating an example view obstructed image 506 being presented on display 244. Image 506 was captured by camera 234 and comprises a depiction 508 of an obstruction and a depiction 509 of lift arms 226. As discussed above, the perimeter of the obstruction imaged by depiction 508 may correspond to a perimeter of the functional tool, a perimeter of the load carrying tool (for example, a bucket or a fork), may correspond to a perimeter of a combination of both the load carrying tool and its load, or may correspond to the perimeter of the load being carried, without the load carrying tool.

As further shown by FIG. 15, controller 240 may prompt an operator to provide input identifying or outlining the location and configuration (size and shape) of the first portion of depiction 508, the pixels of which are to be replaced with corresponding geometrically transformed pixels from a view unobstructed image captured by the camera 234 at nearly the same time that depiction 508 was captured. In some implementations, controller 240 may offer the operator 37 with multiple choices for demarcating the window or other shapes defining the first portion of depiction 508 that is to be replaced. In some implementations where display 244 comprise a touchscreen, the operator may use his or her finger or fingers, or a stylus, to "draw" the first portion on display 244.

In some implementations, a predefined first portion may be presented on screen 244, wherein the operator may drag the top, bottom, left side and/or right side of the depicted predefined first portion with his or her finger or a stylus so as to expand or contract the top, bottom and/or sides of the depicted predefined first portion. In some implementations, the operator may touch the screen with two fingers and perform a pinching motion or a motion for the fingers move away from one another, as indicated by arrows 511, to proportionally shrink or enlarge the depicted predefined or default first portion presented on screen 244. In some implementations, the operator may use a joystick, mouse, touchpad or the like to move a cursor 513 along a path, as indicated by arrows 515, that outlines the perimeter of the window or first portion of the image to be replaced. In some implementations, the operator 37 may be presented with a choice of multiple selections for the predefined first portion, the multiple selections having different sizes and/or shapes.

As further shown by FIG. 15, the first portion of image 506, which is to be replaced, may have a shape or may have dimensions not necessarily coinciding with the perimeter of the depiction 508 of the obstruction. In one example instance, the operator 37 may define a first portion perimeter 520 that coincides with the perimeter of the depiction 508 of the obstruction. In another example instance, the operator 37 may define a first portion perimeter 522 that is larger than the perimeter of the depiction 508 of the obstruction. Such a choice may provide an enhanced view of the environment of the otherwise obstructed scene 35. In another example instance, the operator may define a first portion perimeter 524 which is smaller than the perimeter of the depiction 508 of the obstruction. In such an instance, the geometrically transformed replacement pixels depicting the otherwise obstructed scene 35 may appear as a window within and through the obstruction, permitting the operator to see both portions of the obstruction as well as the otherwise view obstructed scene 35.

In some implementations, the location and configuration of the first portion of the obstructed view image may be consistent amongst different images captured by camera 232 while the obstruction is supported at different heights by lift arms 226. In other implementations, the location and/or configuration of the first portion of the obstructed view image may vary depending upon the height of the obstruction (the height of the functional tool, load carrying tool and/or load) as supported by lift arms 226. In some implementations, while vehicle 224 is stationary, controller 240 may instruct the operator 37 to control of vehicle 224 so as to raise or lower the obstruction through a range of different view obstructing heights or positions. At each of the different view obstructing heights or positions of the obstruction, camera 232 is controlled to capture a respective view obstructed image. The operator may further be prompted to define a particular first portion perimeter for each of the view obstructed images. Thereafter, when the vehicle 224 is being propelled and when the lift arms 226 may be actuated to move the obstruction to different heights, controller 240 may utilize the different operator input first portion perimeters depending upon the current height at which the obstruction is supported by lift arms 226.

Figure 16:
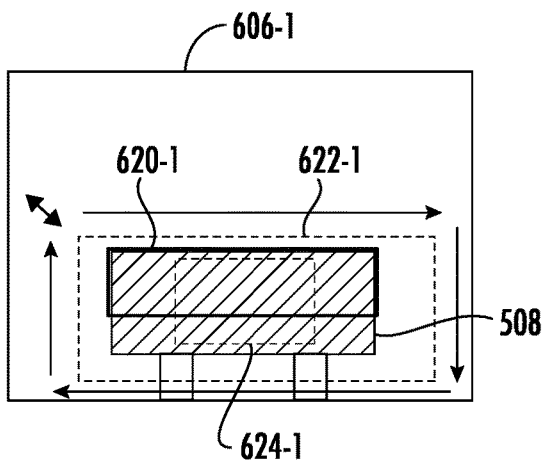
FIG. 16 is a diagram of an example view obstructed image depicting an example obstruction in a lowered position and example operator input outlines of different portions for replacement by corresponding portion from a view unobstructed image.
Figure 17:
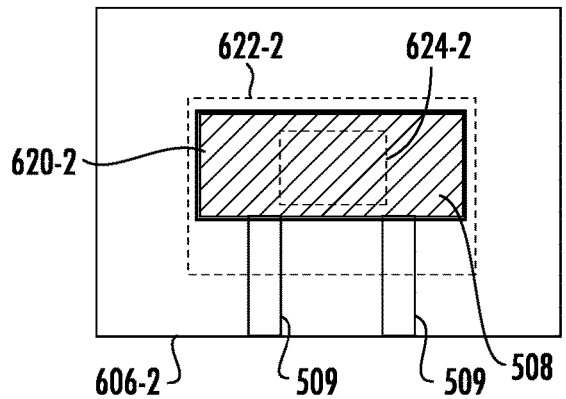
FIG. 17 is a diagram of an example view obstructed image depicting an example obstruction in an intermediate position and example operator input outlines of different portions for replacement by corresponding portions from a view unobstructed image.
Figure 18:
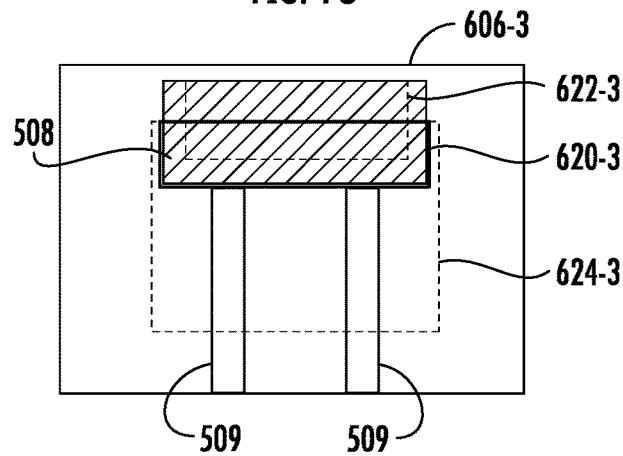
FIG. 18 is a diagram of an example view obstructed image depicting an example obstruction in a higher elevated position and example operator input outlines of different portions for replacement by corresponding portions from a view unobstructed image.

FIGS. 16-18 illustrate three example obstructed images 606-1, 606-2 and 606-3 (collectively referred to as images 606) captured by camera 232 with the obstruction supported at three different heights by lift arms 226. FIG. 16 illustrates different operator demarcated first portion perimeters 620-1, 622-1 and 624-14 when the obstruction and its depiction 508 are in a vertically lower position. FIG. 17 illustrates operator demarcated first portion perimeters 620-2, 622-2 and 624-2 when the obstruction and its depiction 508 are in a vertically intermediate position. FIG. 18 illustrates operator demarcated first portion perimeters 620-3 and 622-3 and 624-3 when the obstruction and its depiction 508 are in a vertically higher position. As shown by FIGS. 16-18, the operator is provided with the option of varying the configuration and location of the perimeter of the first portion of the particular view obstructed image that is to be replaced based upon where the obstruction is located in the image and therefore what portion scene 35 might be obstructed. In FIG. 16, first portion perimeter 620-1 calls for the replacement of only those pixels depicting an upper portion of the obstruction when the obstruction is at a lower position. In contrast, as shown by FIG. 18, when the obstruction is at an elevated or higher position, first portion perimeter 624-3 calls for the replacement of only those pixels depicting a lower portion of the depiction 508 of the obstruction. In addition, a larger portion of the depiction 509 of the lift arms 226 are replaced with corresponding geometrically transformed pixels of the view unobstructed image captured by camera 234 when the obstruction is supported at a higher height.

In some implementations, controller 240 may present the unobstructed view image from the camera 234 on display 244 and may prompt the operator to identify any particular target or targets in the same 235 for which viewing may be important. In such implementations, controller 240 may earmark or tag such target or targets and may automatically determine the location and configuration of the first portion perimeter such that the pixels replacing the interior of the first portion perimeter depicts the target or targets chosen by the operator 37. In some implementations, controller 240 may automatically adjust the positioning and/or configuration of the first portion perimeter as vehicle 224 is driven forwardly or rearwardly or as the lift arms 226 are raised or lowered (based upon signals from the GPS receiver, wheel odometry or visual odometry and based upon signals from position sensor 238) such that the pixels depicting the operator identified target or targets remain in the replaced portion (from camera 234) of the image captured by camera 232 despite the repositioning and resizing of the depiction 508 changing due to such movement of vehicle 224 and/or lift arms 226. In some implementations, controller 240 may automatically shift and/or shrink/enlarge the perimeter of the first portion to be replaced in response to the vehicle 224 being driven forwardly or rearwardly or as a lift arms 226 are raised or lowered, without any operator identification of a particular target or targets in the scene 35.

Figure 19:
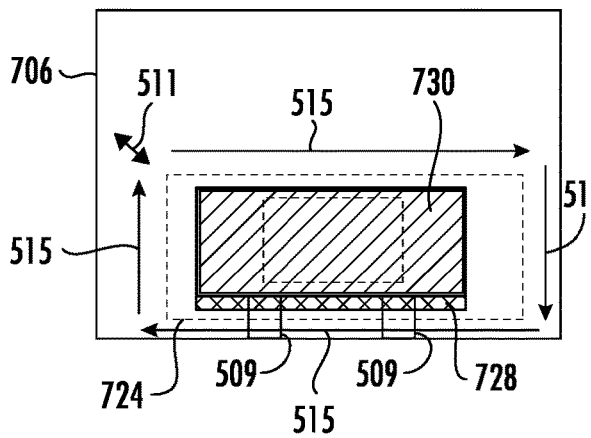
FIG. 19 is a diagram of an example view obstructed image depicting an example load carrying tool with an example load and example operator input outlines of different portions, including the example load carrying tool, for replacement by corresponding portions from a view unobstructed image.
Figure 20:
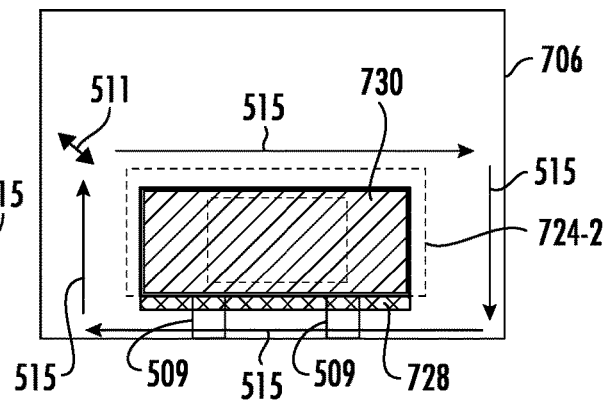
FIG. 20 is a diagram of an example view obstructed image depicting an example load carrying tool with an example load and example operator input outlines of different portions, excluding the example load carrying tool, for replacement by corresponding portions from a view unobstructed image.

As shown by FIGS. 19 and 20, controller 240 may, automatically or based upon input from operator 37 (as indicated by arrow 511 and 515 and described above), determine a first portion perimeter that includes or excludes a load carrying tool. FIG. 19 illustrates an example obstructed image 706 captured by camera 232 that schematically depicts a load carrying tool 728 and its supported load 730. Load carrying tool 728 may comprise a fork or forklift or a bale spear. FIG. 19 illustrates an example where a first portion perimeter 724-1 in the obstructed view image 706 encompasses both the load carrying tool 728 and the load 730. FIG. 20 illustrates an example where the first portion perimeter 724-2 encompasses the load 730, but omits or does not encompass the underlying portions of the load carrying tool 728. In the example shown in FIG. 20, the modified image or view presented to the operator may maintain its depiction of the load carrying tool 728, but may replace those pixels depicting the load 730 with corresponding geometrically transformed pixels from the view unobstructed image captured by camera 234.

Figure 21:
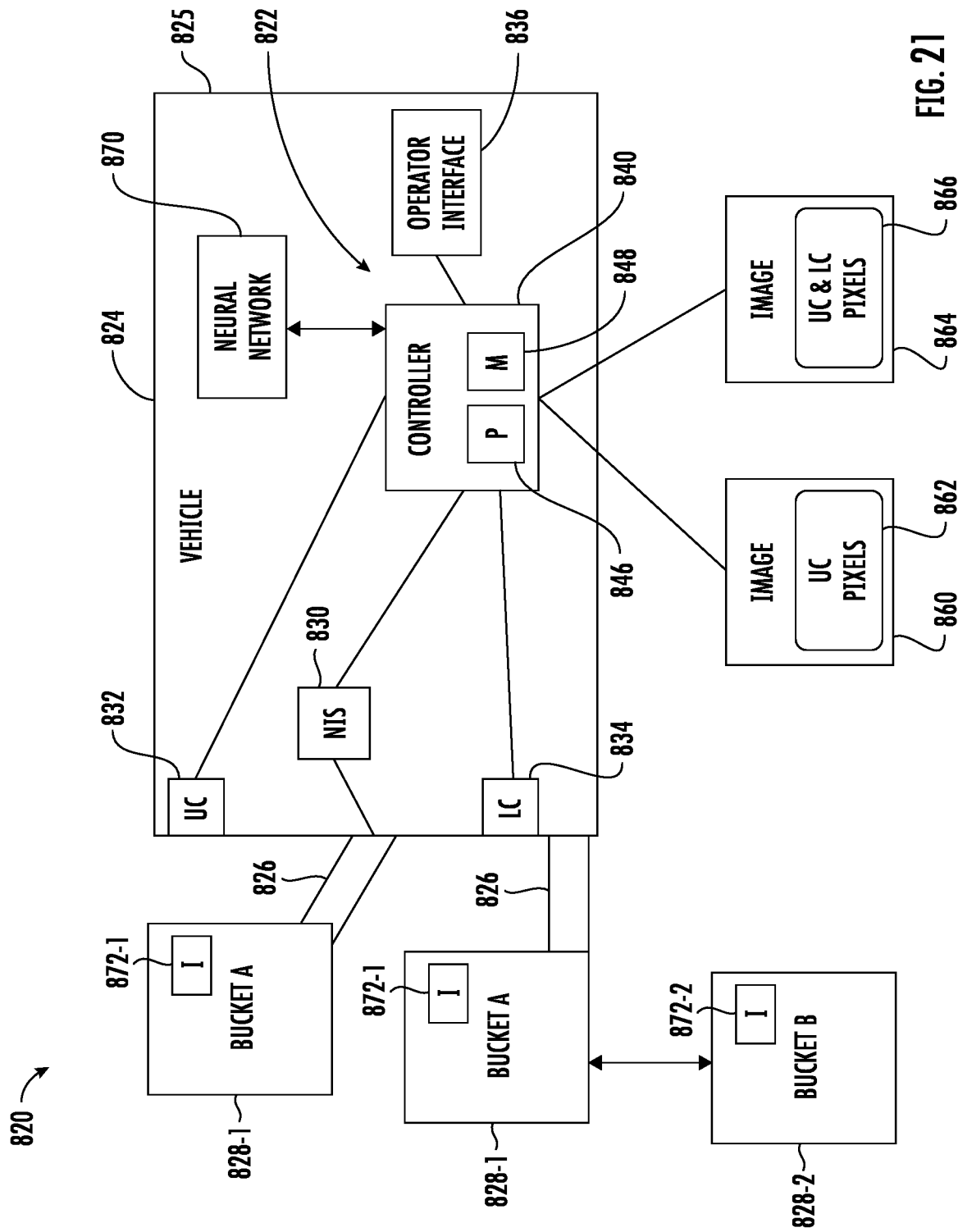
FIG. 21 is a diagram schematically illustrating portions of an example vehicle vision system.

FIG. 21 is a diagram schematically illustrating portions of an example vehicle vision system 820, including an example front loader vehicle 824. Front loader vehicle 824 comprises chassis 825, lift arms 826, bucket 828, nonimage sensor 830, upper camera 832, lower camera 834, operator interface 836 and controller 840. Chassis 825 comprises a frame and traction members, such as wheels or tracks, movably supporting vehicle 824.

Lift arms 826 project forwardly from chassis 825 and are removably coupled to bucket 828-1. Lift arms 826 are configured to facilitate separation of bucket 828-1 and mounting of an alternative bucket 828-2 to front vehicle 624. In the example illustrated, each of lift arms 826 comprises a hydraulic lift arm having a hydraulic cylinder-piston assembly which may be selectively extended and retracted to selectively raise and lower bucket 828-1 or bucket 828-2. As shown by FIG. 21, lift arms 826 are actuatable to move buckets 828-1, 828-2 between a lowered position (shown in broken lines) and a raised operator vision obstructing position (shown in solid lines). In their respective raised operator vision obstructing positions, buckets 828-1 and 828-2 obstruct the forward view of an operator residing on chassis 825. For example, an operator may be seated in a cab of front vehicle 824 or on a seat of vehicle 824, wherein bucket 828-1 or bucket 828-2 directly impedes the operator's forward view in front of vehicle 824.

Non-image sensor 830 comprises at least one sensor configured to output signals indicating or that which may be used to determine a current height or angle (position) of the bucket 828-1, 828-2 currently mounted to lift arms 826. In some implementations, the non-image sensor 830 comprises a potentiometer or other sensor configured to detect an angle of the pair of arms 826 supporting the bucket 828-1, 828-2. In some implementations, the nonimage sensor 830 comprises a hydraulic fluid pressure sensor, wherein the positioning of the arms 826 and the corresponding height of the bucket 828-1, 828-2 may be determined based upon corresponding sensed levels of hydraulic pressure in the hydraulic lift cylinders (cylinder-piston assemblies) positioning and supporting the bucket 828-1, 828-2. In some implementations, the positioning of the bucket 828-1, 828-2 may be determined based upon a combination of signals from the non-image sensor 830 and at least one of the upper and lower cameras 832, 834 supported by the front loader vehicle 824.

Upper camera 832 comprises a forwardly facing camera supported by chassis 825 at a greater height as compared to lower camera 834. Upper camera 832 has a field-of-view with generally extends above the mounted bucket 828-1, 828-2, wherein at certain elevated positions, the mounted bucket 828-1, 628-2 may obstruct or block the field-of-view of upper camera 832. Likewise, lower camera 834 has a field-of-view generally below the mounted bucket 828-1, 828-2, wherein at certain lowered positions, the mounted bucket 828-1, 828-2 may obstruct or block the field-of-view of lower camera 834. Lower camera 834 comprises a forwardly facing camera supported by chassis 825 and a lower height as compared to upper camera 832. In some implementations, camera 832, 834 may comprise a cameras. In some implementations, one or both of camera 832, 834 may comprise stereo cameras. Images captured by camera 832, 834 are transmitted to controller 840.

Operator interface 836 comprises a device or component of vehicle 824 that is configured to present a forwardly facing viewing image for the operator of vehicle 824. Operator interface 836 may comprise a monitor or display screen viewable by the operator residing on chassis 825 or at a remote location. In some implementations, operator interface 836 may be additionally configured to receive commands or input from the operator. For example, operator interface 836 may comprise a touchscreen. In some implementations, operator interface 836 may comprise a display monitor and a separate input device such as a mouse, keyboard, joystick or the like.

Controller 840 comprises processing unit 846 and memory 848. Processing unit 646 follows instructions provided in memory 848. Memory 848 comprises a non-transitory computer-readable medium which contains such instructions. Following such instructions contained in memory 848, processing unit 846 polls or otherwise receives image data from camera 832, 834 and signals from nonimage sensor 830. Processing unit 846 further utilizes signals from sensor 830 to determine the position (height and/or angle) of bucket 828-1, 828-2 to determine whether the bucket 828-1, 828-2 may be interfering with or obstructing the view of the operator residing on vehicle 824 or remote from vehicle 824. In some implementations, processing unit 646 of controller 840 may determine whether or not the bucket 828-1, 828-2 is in a raised operator vision obstructing position based upon a combination of signals from sensor 830 as well as camera 832 and/or camera 834.

When the mounted bucket 828-1, 828-2 is in a lowered position (shown in broken lines), a position wherein the mounted bucket 828-1, 828-2 is not obstructing viewing by the operator, controller 840 may present image 860 (shown in broken lines) on a display portion of operator interface 836 which may be composed of the upper camera pixels 862 from upper camera 832, without any images or pixels from lower camera 834. In some implementations, image 860 may not be presented given that the operator may visibly see over and above the mounted bucket 828-1, 828-2.

In response to determining that the mounted bucket 828-1, 828-2 has been moved to a raised operator vision obstructing position, controller 840 may present image 864 (shown in solid lines) on a display portion of operator interface 836. Image 864 is composed of pixels 866 from both upper camera 832 and lower camera 834. Those pixels depicting the rear side of the mounted bucket 828-1, 828-2 captured by upper camera 832, obstructing the view forward of the bucket, are replaced with corresponding perspectively/geometrically transformed pixels from the lower forwardly facing camera 834. In other words, the region of image 864 which would, without pixels of lower camera 834, simply depict the backside of the mounted bucket 828-1, 828-2, instead comprises those image pixels, from the image captured by lower camera 834, that correspond to the environment in front of the obstructing bucket 828-1, 828-2. These pixels that replace the bucket may appear as a transparent window, replacing or overlapping the portion of the image captured by upper camera 832 that contains the bucket.

In some implementations, the replacement of the pixels of the bucket in the image from the upper camera 832 are continually replaced with perspectively/geometrically transformed pixels from the image from the lower camera 834 as the mounted bucket 828-1, 828-2 is raised and lowered while in a vision obstructing position. This results in the transparent window, replacing the bucket in the image, also being continually raised and lowered with movement of the lift arms 826. This may result in a first portion of the region in front of the bucket originating from the image captured by upper camera 832 and a second portion of the region in front of the bucket originating from the image captured by lower camera 834.

The point or range at which the currently mounted bucket 828-1, 828-2 obstructs the vision of the operator may vary from one bucket to another depending upon the size and/or type of the bucket currently being mounted to lift arms 826. To facilitate the use of different buckets with vehicle 824, vision system 820 may additionally be configured to receive or determine the specific identity (size and/or type) of the bucket currently mounted to lift arms 826. Upon receiving or determining the specific identity of the bucket, controller 840 may utilize a different triggering threshold for when controller begins and ends replacement of bucket pixels from the image captured by upper camera 832 with corresponding pixels forward of the bucket, captured by lower camera 834. For example, controller 840 may consult a lookup table which associates different bucket position (angle and/or height) triggering thresholds for different sizes or types of buckets.

In some implementations, system 820 automatically identifies the size or type of bucket currently mounted based upon images from at least one of the upper and lower cameras 832, 834, wherein a trained neural network 870 identifies a bucket currently attached and wherein the controller 840 selects the particular image transforming height or angle threshold for the particular bucket. For example, the controller 840 may consult a lookup table storing different transforming height or angle thresholds for different types or sizes of buckets.

In some implementations, an operator may identify or select the type or size of bucket currently mounted and used by the front vehicle in response to a prompt presented on operator interface 836 by controller 840. In such implementations, the controller 840 may use the identification of the bucket to select from amongst several image transforming height or angle thresholds.

In some implementations, each of the different types of buckets 828-1, 828-2 may include an identifier 872-1, 872-2 mounted to or carried by the particular bucket 828-1, 828-2, respectively. The identifier 872-1, 872-2 may be in the form of a visible lead readable code, such as a barcode or QR code, wherein the upper camera 832 or the lower camera 834 captures an image of the code and wherein the controller determines the type and/or size of the bucket based upon the read code. Once the bucket has been identified, the controller 840 may apply the image transforming height or angle threshold based upon the identified bucket.

In some implementations, the identifier 872-1, 872-2 may comprise a wireless sensor tag configured to transmit a signal or to be read by corresponding reader scanner on the front vehicle. For example, the identifier may comprise a radiofrequency identifier (RFID) tag mounted to the bucket 828-1, 828-2. The RFID tag may indicate the type and such or size of the bucket to the controller, wherein the controller then applies the appropriate image transforming height or angle threshold based upon the identified bucket.

In some implementations, instructions in memory 848 may direct processing unit 846 to provide the operator with an opportunity to adjust the image transforming height or angle threshold. For example, a shorter operator may wish to lower the threshold at which the examples begin to replace pixels of the bucket 828-1, 828-2 in the image from the upper camera 832 with perspectively transformed pixels of regions beyond the bucket from the image from the lower camera 834. Conversely, a taller operator may wish to raise the threshold at which controller 840 begins to replace pixels of the bucket in the image from the upper camera 832 with perspectively transformed pixels of regions beyond the bucket from the image from the lower camera 834.

In some implementations, the transparent window resulting from the replaced pixels may be raised or lowered by an operator using operator interface 836. For example, the transparent window may be on the display of operator interface 836 at the time when the bucket initially satisfies the default threshold for the particular mounted bucket. At such time, the operator may be given the opportunity to touch the transparent window on the touchscreen serving as operator interface 836 and vertically raise or lower the transparent window on the touchscreen to correspondingly raise or lower the threshold at which such pixel replacement begins. In some implementations, the operator may move a mouse to select the transparent window and drag the transparent window upwards or downwards to correspondingly raise or lower the threshold which such pixel replacement begins.

Figure 22:
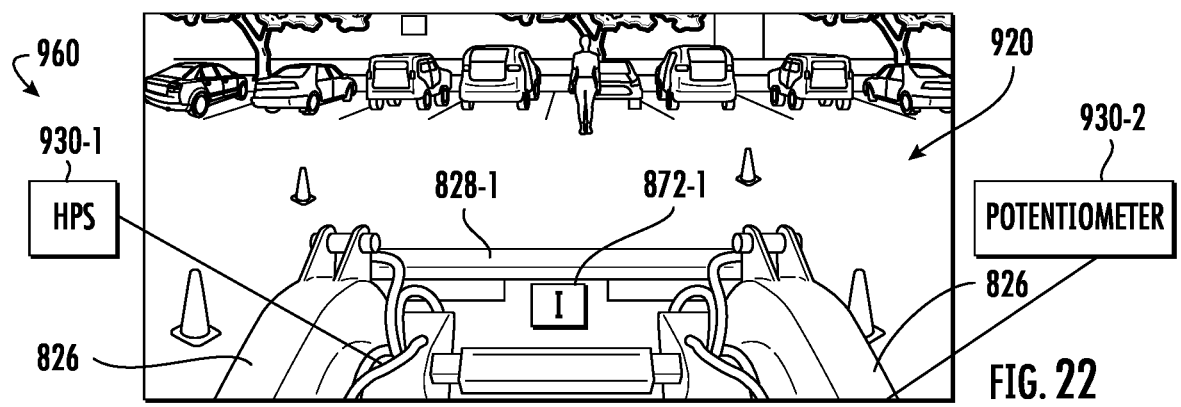
FIG. 22 is a diagram schematically illustrating portions of an image output by the example vehicle vision system of FIG. 21 with an example bucket in a first position.
Figure 23:
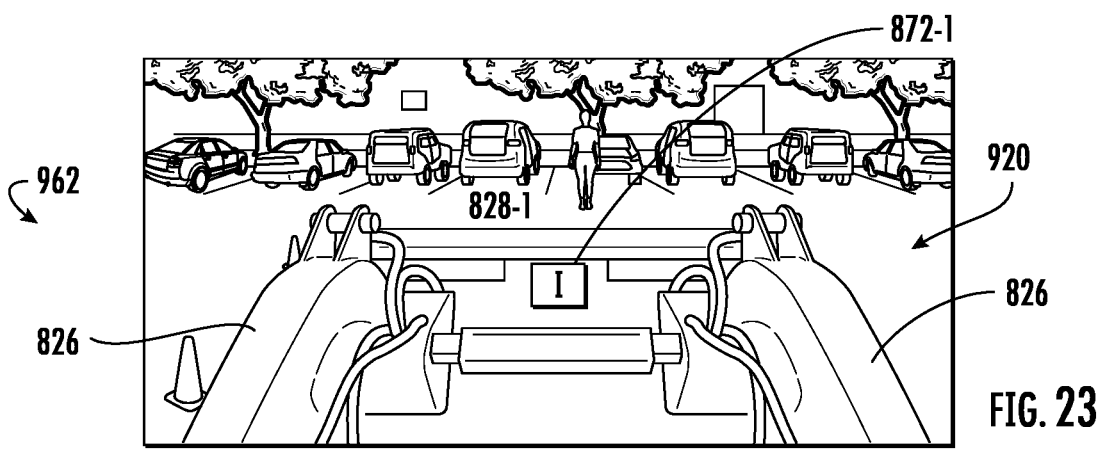
FIG. 23 is a diagram schematically illustrating portions of an image output by the example vehicle vision system of FIG. 21 with the example bucket in a second position.

FIGS. 22-23 illustrate portions of an example image 960 output by controller 840 on operator interface 836 during vertical raising of an example bucket 928 of an example front vehicle 920. Image 960 is formed by controller 840 from images captured by upper camera 832 without pixels from the image captured by lower camera 834.

Figure 24:
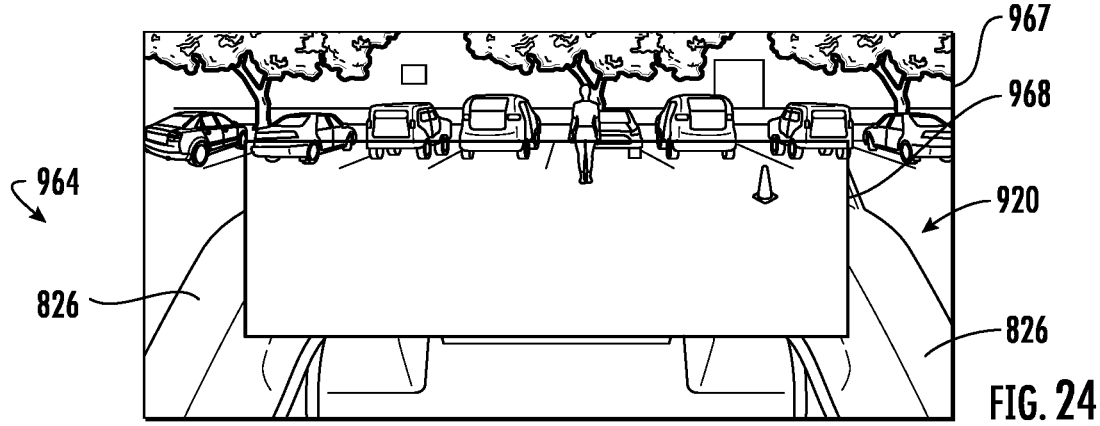
FIG. 24 is a diagram schematically illustrating portions of an image output by the example vehicle vision system of FIG. 21 with the example bucket in a third position.
Figure 25:
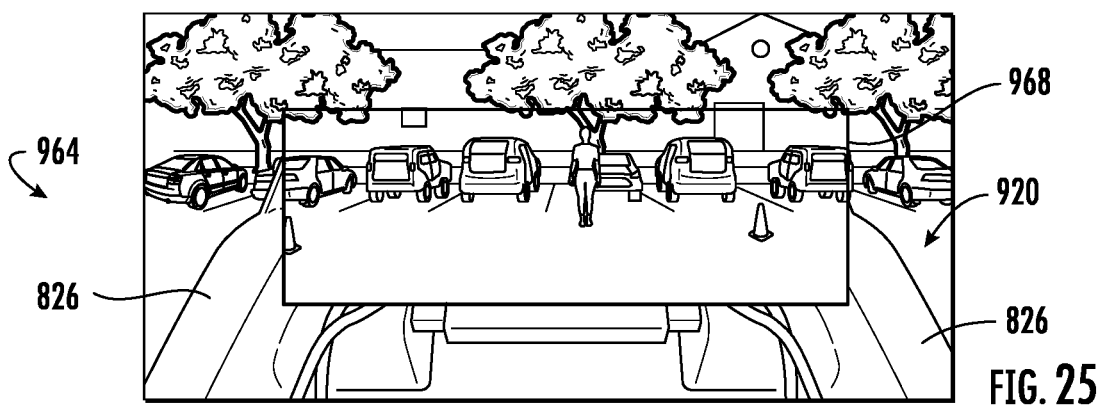
FIG. 25 is a diagram schematically illustrating portions of an image output by the example vehicle vision system of FIG. 21 with the example bucket in fourth position.

FIGS. 24 and 25 illustrate portions of an example image 964 during vertical raising of the example bucket 928 of the example front vehicle 920. Image 964 is formed by controller 840 from images captured by both upper camera 832 and lower camera 834. Image 964 comprise a first portion 967 formed by the pixels from the image captured by upper camera 832 and a second portion 968 formed from perspectively session geometrically transformed pixels from the image captured by lower camera 834. The perspectively transformed pixels forming second portion 968 correspond to those replaced pixels from the image captured by upper camera 832. The perspectively transformed pixels forming second portion 968 appear as a transparent window within the image captured by upper camera 832, depicting those regions in front of bucket 828-1.

FIGS. 22 and 23 illustrate the raising of the example bucket 828-1, wherein the image 762 is formed entirely from pixels of the image captured by upper camera 832. FIG. 24 illustrates a point in time at which the bucket 828-1 has been raised to an operator vision obstructing position, a height at which the replacement of those pixels depicting bucket 828-1 with corresponding pixels from the image of lower camera 834 is triggered. As described above, in some implementations, an operator may be permitted to touch the window formed by portion 968 on a touchscreen or select the windows 968 with a pointer controlled by a mouse such that the transparent window provided by portion 968 may be dragged or moved upwardly or downwardly to adjust the height of the bucket 828 at which such pixel replacement is to be triggered.

FIG. 25 illustrates a further elevation of lift arms 826 and the lifting of bucket 828-1 (shown in FIGS. 22 and 23). As shown by FIG. 25, further lifting of bucket 828-1 still maintains bucket 828-1 in an operator vision obstructing position. As the bucket is continued to be raised, the replacement of the pixels representing the bucket with the perspectively transformed pixels from the image of lower camera 834 also continues. This results in the transparent portion 768 also moving vertically with the vertical movement of lift arms 826 in a continuous and seamless fashion.

Those components of front vehicle 920 which correspond to components of front vehicle 824 are numbered similarly in FIGS. 22-25 and/or are shown in FIG. 21. As shown by FIG. 22, bucket 828-1 comprises the above-described identifier 872-1. The example front vehicle 920 further comprises two mechanisms for assisting in the identification of the current height or position of bucket 828-1 to facilitate the determination by controller 840 of when to begin replacing selected pixels from the image output by upper camera 832 with perspectively transformed pixels of lower camera 834. In the example illustrated, front loader vehicle 720 comprises hydraulic pressure sensor 930-1 and a potentiometer 930-2, both of which are schematically illustrated.

Hydraulic fluid pressure sensor 930-1 outputs signals indicating the level of hydraulic pressure I the hydraulic lift cylinders, wherein the positioning of the arms 826 and the corresponding height of the bucket 828-1, 828-2 may be determined based upon corresponding sensed levels of hydraulic pressure in the hydraulic lift cylinders (cylinder-piston assemblies) positioning and supporting the bucket 828-1, 828-2. Potentiometer 930-2 serves as a non-image sensor configured to detect an angle of the pair of arms 826 supporting the bucket 828-1, 828-2. In some implementations, the positioning of the bucket 828-1, 828-2 may be determined based upon a combination of signals from sensors 930-1 and 930-2. In some implementations, the positioning of bucket 828-1, 828-2 may be determined based upon a combination of signals from sensors 930-1, 930-2 and at least one of the upper and lower cameras 832, 834 supported by the vehicle 824.

In each of the above examples, the pixels of the second portion of the view unobstructed image captured by camera 234 are geometrically (perspectively) transformed and used to replace the pixels of the corresponding first portion of the view obstructed image captured by camera 232. The controller 40, 240 determines what portion of the view obstructed image should be replaced such that the operator may view, on a display, an unobstructed view of the scene 35 from the same perspective as the upper camera 232. In each of the above examples, controller 240 may alternatively or additionally display the second portion of the view unobstructed image captured by camera 232 on a transparent medium at a location on the transparent medium corresponding to the obstruction obstructing the operator's view of a scene. In such implementations, the controller 40, 240 may determine where to project or otherwise display the second portion of the second image/lower image based upon and using any of the above-described methods for determining the location and configuration of the first portion. As result, the operator may view a transparent or opaque representation of the obstructed image on the transparent medium directly in front of the obstruction (functional tool, load carrying tool and/or load) as might otherwise be viewed through the transparent medium.

Figure 26:
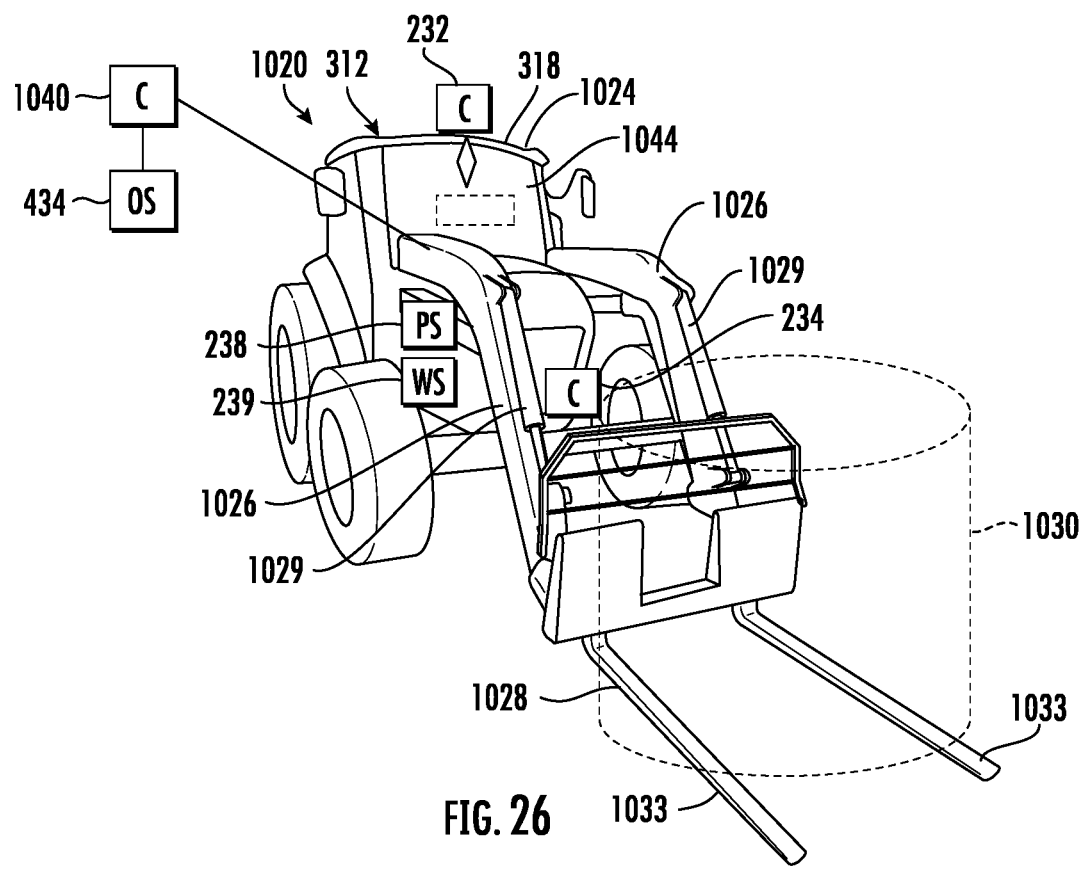
FIG. 26 is a front perspective view illustrating portions of an example vehicle vision system.

FIG. 26 is a front perspective view illustrate portions of an example vehicle vision system 1020. System 1020 comprises an example vehicle 1024 which may be similar to vehicle 224 described above except that vehicle 1024 comprises a front transparent medium 1044 in the form of a front transparent or see-through display/windshield, such as a transparent OLED display screen, or comprises a transparent windshield with a projector to project an image on the transparent windshield. In the example illustrated, vehicle 1024 is illustrated as having lift arms 1026 which may be hydraulic the raised and lowered by hydraulic jacks on 1029. Vehicle 1024 is illustrated as being connected to a load carrying tool 1028 having forks 1033 for directly engaging a load (such as a bale) or for engaging a load in a container or on a pallet. Those remaining components of vehicle 1024 which correspond to vehicle 224 are numbered similarly.

Controller 1040 is similar to controllers 40 and 240 in that controller 1040 is configured to present an operator with an unobstructed view of a scene that may be currently obstructed by an obstruction. Controller 1040 comprises a memory comprising instructions configured to direct a processor to operate in a vision assistance mode in which a method, similar to method 100 described above, is carried out. In the example illustrated, controller 1040 carries out a method similar to method 100 except that in block 122, controller 1040 geometrically transformed second pixels based on a perspective of the operator behind the transparent medium 1044, rather than camera 232. Rather than replacing portion of the pixels from an image captured by camera 232 and displaying the modified image on a display, controller 1040 projects or otherwise displays the pixels of the second portion (corresponding to the determined first portion of the view obstructed image captured by camera 32 and comprising the obstruction) onto the transparent medium in the line of sight of the operator to the obstruction. The pixels of the second portion being presented on the transparent medium 1044 and overlying or extending directly in front of the physical real world obstruction as seen through the transparent medium 1044 may be opaque, blocking view of the real world physical obstruction behind such pixels or may be translucent, permitting the operator to see the real world physical obstruction through the otherwise obstructed scene on the transparent medium 1044 in front of the obstruction. In some other implementations, the image presented on the transparent medium may be from a perspective of camera 232.

Figure 27:
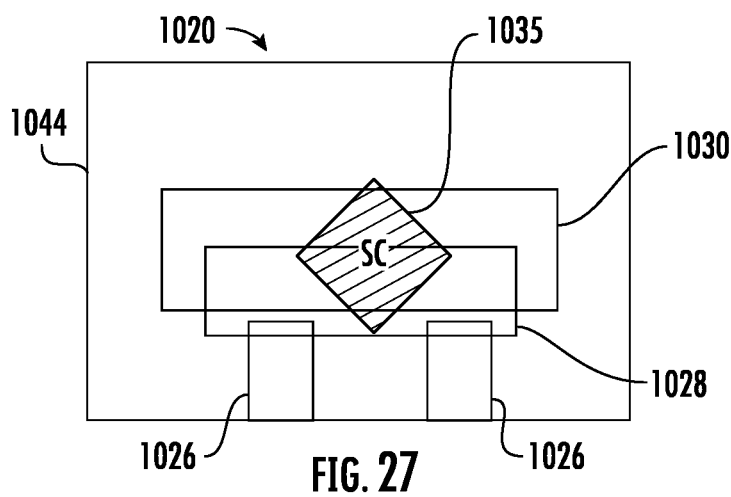
FIG. 27 is a diagram illustrating an example of an operator's view with the example vehicle vision system of FIG. 26.
Figure 28:
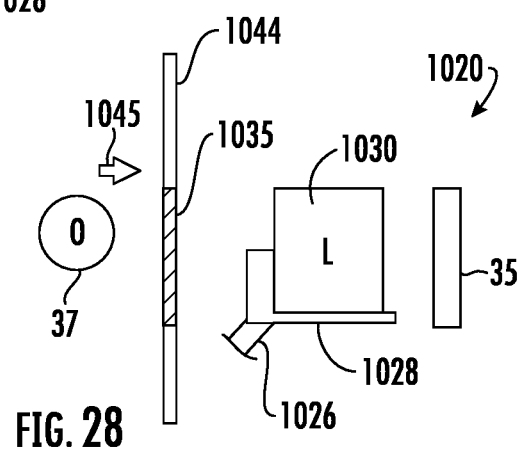
FIG. 28 is a side view illustrating portions of the example vehicle vision system of FIG. 27.

FIGS. 26 and 27 illustrate portions of vehicle vision system 1020. FIG. 27 illustrates an operator's view through transparent medium 1044. FIG. 28 illustrates a side view of system 1020 shown in FIG. 27. As shown FIG. 28, the operator 37 has a line of sight 1045 towards scene 35; however, in some positions, the lift arms 1026 may be supporting the load carrying tool 1028 which also may be supporting an example load 1030 which obstructs the operator's view of scene 35. When operating in a vision assistance mode, controller 1040 geometrically transforms pixels 1035 of an image captured by the lower camera 1029 which may have an unobstructed view of scene 35 when camera 232 is obstructed. The geometrically transformed pixels 1035 depicting the scene 35 are displayed or projected onto the transparent medium 1044 at a location corresponding to where the operator would see the obstruction (load carrying tool 1028 and load 1030). As indicated above, in some implementations, the pixels 1035 are opaque, blocking view of the obstruction which lies behind such pixels. In other implementations, the pixels 1035 are translucent, permitting the operator to see the obstruction through the translucent pixels 1035 depicting the otherwise obstructed scene 35.

Figure 29:
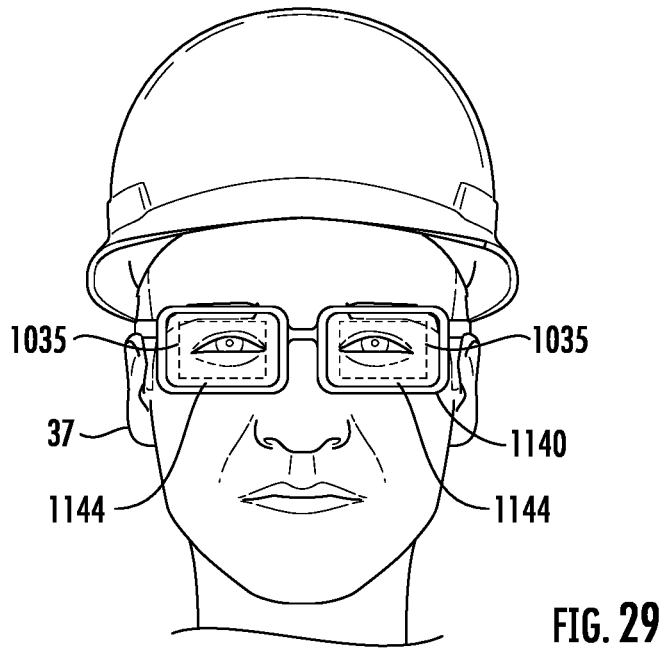
FIG. 29 is a diagram schematically illustrating portions of an example vehicle vision system employing glasses or goggles as a transparent medium.

As schematically shown in FIG. 29, in some implementations, rather than displaying or projecting the pixels 1035 onto transparent medium 1044 in the form of a transparent display or windshield, the operator 37 may be provided with goggles/glasses 1140 providing a transparent medium 1144 onto which the pixels 1035 may be displayed or projected. In both of the example shown in FIGS. 25-28, the operator 37 is provided with an augmented reality in which the operator may see the real world and spare medium with portions supplemented or supplanted by images or representations of an otherwise obstructed scene 35.

Figure 30:
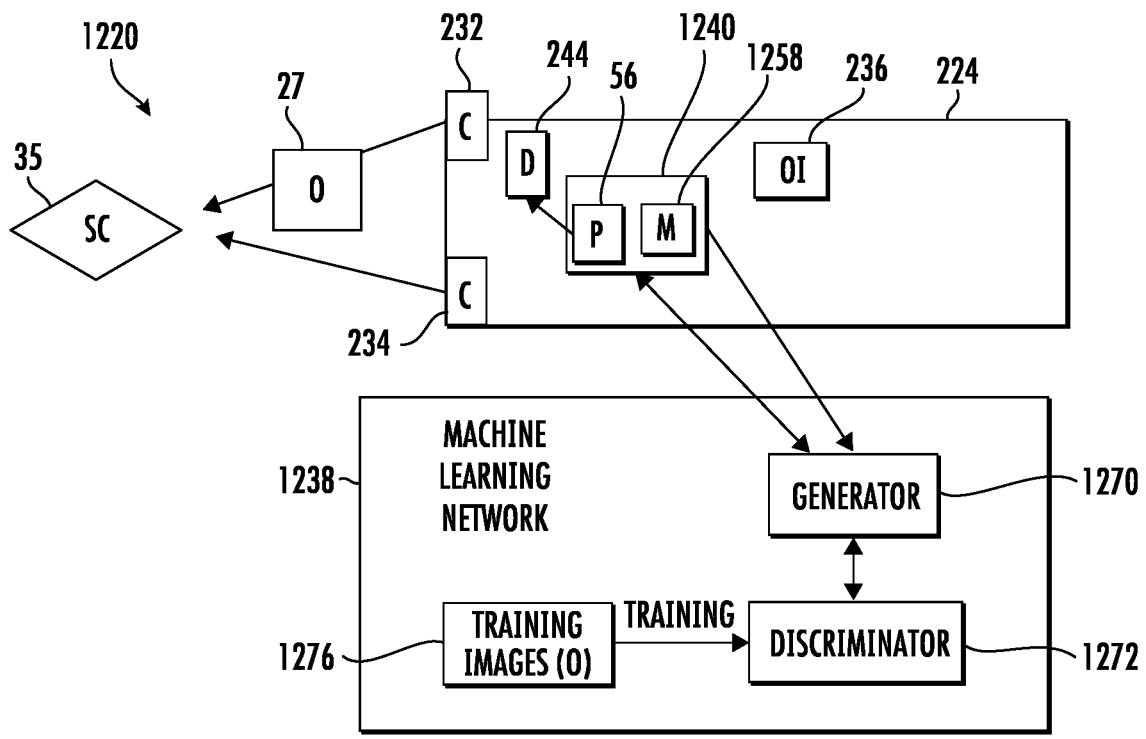
FIG. 30 is a diagram schematically illustrating portions of an example vehicle vision system having a machine learning network.

FIG. 30 is a diagram schematically illustrating portions of an example vehicle vision system 1220. In contrast to the above-described vision systems, vision system 1220 utilizes a trained machine learning network or neural network to present a morphed or new composite image of an otherwise view obstructed scene to an operator. Vehicle vision system 1220 comprises vehicle 224, upper camera 232, lower camera 234, operator interface 236 and display 244 as described above. Vehicle vision system 1220 further comprises a trained machine learning network 1238 and a controller 1240.

Machine learning network 1238 comprises a neural network or other machine learning network having a generator 1270 and a discriminator 1272. Generator 1270 comprise a software module or processing module that receives an obstructed view image from camera 232 that comprises a depiction of an obstruction 27 which visually obstructs scene 35 in the field-of-view of camera 232. Generator 1270 further receives an unobstructed image from camera 234, captured by camera 234 tension the same time (or without intervening movement of vehicle 224 or obstruction 27) that the obstructed view images captured by camera 232 or at different times without intervening movement of vehicle 224 or obstruction 27. Generator 1270 differently combines the image from camera 232 and the image from camera 234 to form a plurality of different candidate composite images. The different combinations may involve different perspective or geometric transformations of different portions of such images, different intensity of different pixels in such images and the like.

Discriminator 1272 comprises software module or a processing module configured to perform an evaluation of each of the different candidate composite images generated by generator 1270. The evaluation is based upon prior training of discriminator 1272 with unobstructed images 1276 of the scene 35 by camera 232. Based upon the evaluation, discriminator 1272 recommends or outputs a particular one of the candidate composite images for display on display 244 by controller 1240.

Controller 1240 may comprise a processor 56 and a memory 1258. Memory 1250 may comprise a c non-transitory computerized readable medium containing instructions for directing processor 56 to capture images using cameras 232, 234, to interface with machine learning network 1238 and display the chosen candidate composite image from discriminator 1272 on display 244. In some implementations, the machine learning network 1238 may reside locally on vehicle 1224. In other implementations, the machine learning network 1238 may be a cloud-based network which receives images from multiple different vehicles and which is wirelessly accessed by controller 1240 of each of such vehicles 1224.

Figure 31:
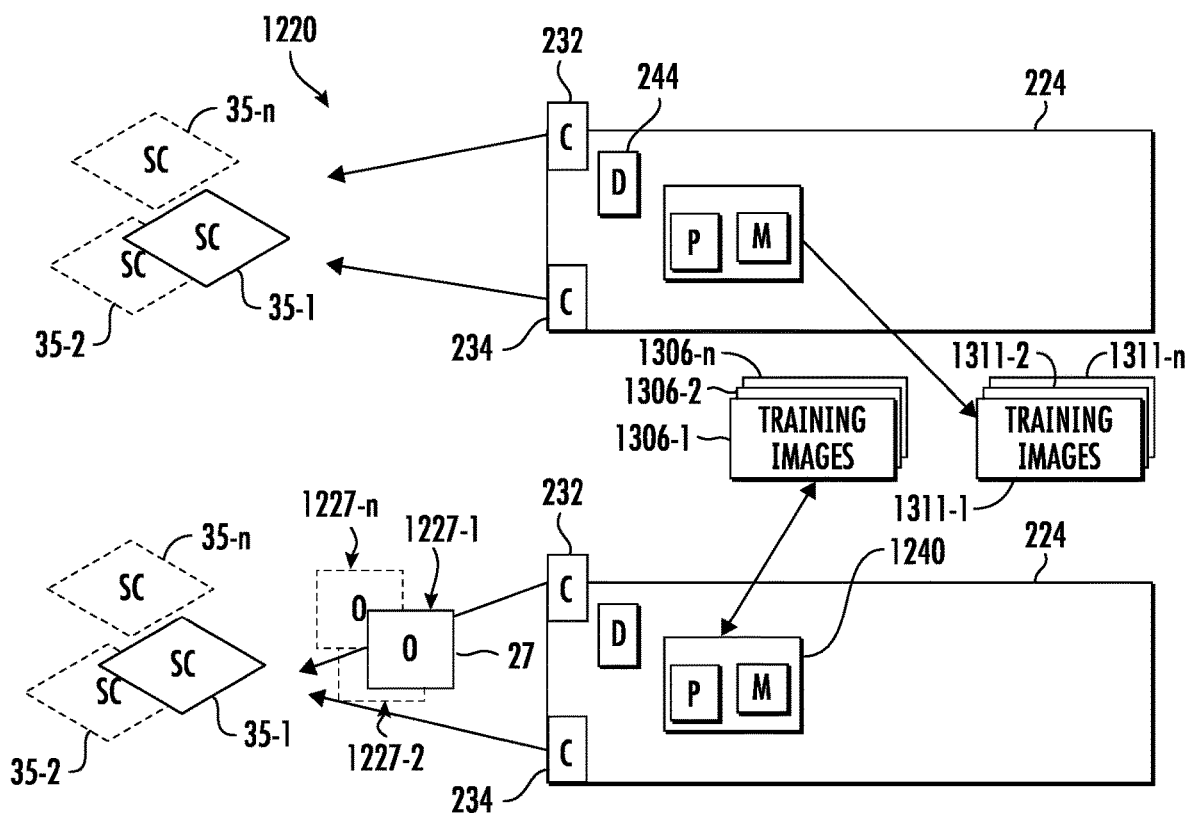
FIG. 31 is a diagram schematically illustrating collection of training images for training of the machine learning network of the example vehicle vision system of FIG. 30.

FIG. 31 is a diagram schematically illustrating the generation of training images 1276 by system 1220. During such training, controller 1240 directs camera 232 and 234 to capture different scenes 35-1, 35-2 . . . 35-n with cameras 232 and 234 while the view of such scenes by camera 232 are visually obstructed by the same obstruction 27, but supported at different view obstructing positions 1227-1, 1227-2 . . . 1227-n, producing obstructed training images 1306-1, 1306-2 . . . 1306-n, respectively. Controller 1240 further outputs control signals to lift arms 226 (shown in FIG. 9) to move the obstruction 27 to a position at which obstruction 27 does not obstruct the view of camera 232. Controller 1240 may direct the operator to provide inputs causing such movement or may automatically output control signals during such training. In some implementations, controller 1240 may prompt the operator to remove the functional tool or load carrying tool (and any care load) such that the view of each of the different scenes 35 by camera 232 is not visually obstructed.

At such time, cameras 232 and 234 capture unobstructed images of the same scenes 35-1, 35-2 . . . 35-n to produce training images 1311-1, 1311-2 . . . 1311-n, respectively. Each of the unobstructed training images 1311-1, 1311-2 . . . 13-11—in a be paired or associated with its corresponding visually obstructed training image 1306-1, 1306-2 . . . 1306-n, respectively. Such pairs of training images form training images 1276 which are used to train discriminator 1272 to evaluate candidate composite images output by generator 1270 based upon a view obstructed image from camera 232 and an unobstructed view image from camera 234.

Each of the above examples provide the operator with an image of a scene, forward or rearward of the vehicle, from a perspective in circumstances where viewing of this from the same perspective is otherwise obstructed by an obstruction. It should be appreciated that the capture of the first view obstructed image and the capture of the corresponding view unobstructed image by the first and second cameras, respectively, may be performed in real time. Likewise, the modification of the first view obstructed image using the second view unobstructed image or the generation of a new image using a trained machine learning network may be performed in real time. In this disclosure, "real-time" means that the modified image of the newly generated image are presented to the operator while the obstruction continues to obstruct viewing of the scene that would otherwise be obstructed from the particular perspective of the operator or the first camera. In some circumstances, "real-time" means that the images presented within one second of the capture of such images.

Moreover, in each of the above examples, the images may be in the form of image frames. The vision systems may continuously and rapidly present such modified or newly generated images/image frames (either on a display screen or on a transparent medium) to the operator as the vehicle is being propelled and steered forwardly or rearwardly and/or as the functional tool or any load carrying load is being raised or lowered. The example vision systems may output and present the modified first images/image frames or the newly generated images/image frames from the machine learning network as part of a live stream video. The video may depict the vehicle moving closer to or farther from the scene and may depict the lift arms or portions of the obstruction being raised and lowered as the modified image frames or newly generated image frames from the machine learning network are displayed. As the vehicle or its lift arms move, the window or image showing the otherwise obstructed scene 35 may likewise move.

Although the claims of the present disclosure are generally directed to providing an operator with a view of a scene otherwise obstructed by an obstruction movably supported by a vehicle, the present disclosure is additionally directed to the features set forth in the following definitions.

Definition 1. A vehicle vision system comprising:
  a vehicle configured to movably support an obstruction blocking an operator's view of a scene;
  a lower camera mounted to the vehicle to capture a lower image of the scene beyond the obstruction;
  an upper camera mounted to the vehicle to capture an obstructed upper image depicting the obstruction;
  a controller configured to:
    identify a first portion of the obstructed upper image that comprises the obstruction, the first portion being formed by first pixels;
  identify a second portion of the lower image depicting the scene obstructed by the obstruction, the second portion being formed by second pixels;
  geometrically transform the second pixels based on a perspective of the upper camera; and
  replace the first pixels in the obstructed upper image with the geometrically transformed second pixels to form a modified upper image; and
  display the modified upper image to the operator.

Definition 2. The vehicle vision system of Definition 1, wherein the obstruction comprises a load carrying tool.

Definition 3. The vehicle vision system of Definition 2, wherein the load carrying tool comprises a bucket.

Definition 4. The vehicle vision system of Definition 1, wherein the obstruction comprises a load carried by the tool and vertically extending beyond the tool.

Definition 5. The vehicle vision system of Definition 1, wherein the controller is configured to identify the first portion based upon image segmentation of the upper image to identify boundaries of the obstruction.

Definition 6. The vehicle vision system of Definition 1, wherein the controller is configured to determine a height at which the obstruction is supported by the vehicle and to identify the first portion based upon the height and generic obstruction specifications.

Definition 7. The vehicle vision system of Definition 6, wherein the generic obstruction specifications comprise operator input or stored specifications for a load carrying tool of the vehicle.

Definition 8. The vehicle vision system of Definition 6, wherein the generic obstruction specifications comprises operator input or stored specifications for a load lifted carried by the vehicle.

Definition 9. The vehicle vision system of Definition 1, wherein the controller is configured to determine a height at which the obstruction is supported by the vehicle and to identify the first portion based upon a sensed weight of the obstruction carried by the vehicle.

Definition 10. The vehicle vision system of Definition 1 further comprising a non-image sensor configured to output signals indicating a height of the obstruction, wherein controller is configured to identify the first portion based upon the height.

Definition 11. The vehicle vision system of Definition 1 further comprising a library of stored obstruction specifications, wherein the controller is configured to determine a height at which the obstruction is supported by the vehicle and to identify the first portion based upon the height and a selected one of the obstruction specifications.

Definition 12. The vehicle vision system of Definition 1, wherein the controller is configured to receive input from the operator defining a configuration of the first portion.

Definition 13. The vehicle vision system of Definition 12 further comprising a display, wherein the controller is configured to present the upper image on the display and wherein the input received from the operator defining the configuration of the first portion is presented on the upper image on the display.

Definition 14. The vehicle vision system of Definition 1, wherein the controller is configured to adjust a configuration of the first portion based upon a height of the obstruction as the obstruction is vertically moved by the vehicle.

Definition 15. The vehicle vision system of Definition 1 further comprising a display, wherein the upper camera is configured to capture an unobstructed upper image of the scene, wherein the controller is configured to automatically switch from presenting the unobstructed upper image of the scene and the modified upper image on the display based upon a height of the obstruction.

Definition 16. The vehicle vision system of Definition 15, wherein the vehicle comprises a load carrying tool that is raised and lowered by the vehicle and wherein the controller is configured to present the unobstructed upper image of the scene in response to the load carrying tool being at a height without supporting a load and is configured to present the modified upper image in response to the load carrying tool being at the height while supporting a load.

Definition 17. The vehicle vision system of Definition 1 further comprising a display, wherein the controller is configured to:
  present the obstructed upper image on the display;
  determine presence of a predefined target in the lower image; and
  automatically switch from presenting the obstructed upper image on the display to presenting the modified upper image on the display based upon the presence of the predefined target in the lower image.

Definition 18. The vehicle vision system of Definition 17, wherein the controller is configured to switch from presenting the obstructed upper image on the display to presenting the modified upper image on the display additionally based upon a determined distance between the predefined target and the vehicle.

Definition 19. The vehicle vision system of Definition 1, wherein the first portion has an outline corresponding to an outline of the obstruction.

Definition 20. The vehicle vision system of Definition 1, wherein the vehicle comprises a load carrying tool for vertically raising and lowering a load and wherein the first portion has an outline corresponding to an outline of the load being carried by the load carrying tool.

Definition 21. A vehicle vision system comprising:
  a vehicle configured to movably support an obstruction blocking an operator's view of a scene;
  a first camera mounted to the vehicle to capture a lower image of the scene beyond the obstruction;
  a second camera mounted to the vehicle to capture an obstructed upper image depicting the obstruction;
  a machine learning network comprising:
    a generator to differently combine the first image and the second image to form different candidate composite images; and a discriminator configured to:
perform an evaluation of the different candidate composite images based upon training with unobstructed images of the scene from the second camera; and
display a particular one of the candidate composite images based upon the evaluation.

Definition 22. A vehicle vision system comprising:
a first camera mounted to the vehicle to capture a first image depicting an obstruction blocking an operator's view of a scene;
a second camera mounted to the vehicle to capture a second image depicting the scene beyond the obstruction blocking the operator's view of the scene;
a controller configured to:
identify a first portion of the first image that comprises the obstruction, the first portion being formed by first pixels;
identify a second portion of the second image that comprises the scene, the second portion being formed by second pixels;
geometrically transform the second pixels based on a perspective of the first camera; and
replace the first pixels in the first image with the geometrically transformed second pixels to form a modified first image; and
display the modified first image to the operator.

Definition 23. The vehicle vision system of Definition 22, wherein the first camera and the second camera face in a forward direction.

Definition 24. The vehicle vision system of Definition 22, wherein the first camera and the second camera face in a rearward direction.

Definition 25. The vehicle vision system of Definition 22, wherein the first camera is at a first angle relative to horizontal and wherein the second camera is at a second angle relative to horizontal and different than the first angle.

Definition 26. A vehicle vision system comprising:
a transparent medium configured to facilitate viewing of a scene on a first side of the transparent medium by an operator on a second side of the transparent medium;
a vehicle configured to movably support an obstruction blocking the operator's view of the scene;
a camera mounted to the vehicle to capture a lower image comprising the scene beyond the obstruction; and
a controller configured to display a portion of the lower image depicting the scene obstructed by the obstruction on the transparent medium.

Definition 27. The vehicle vision system of Definition 26, wherein the controller is configured to display the portion of the lower image depicting the scene obstructed by the obstruction directly in front of the obstruction.

Definition 28. The vehicle vision system of Definition 27, wherein the controller is configured to move the displayed portion of the lower image on the transparent medium in unison with movement of the obstruction.

Definition 29. The vehicle vision system of Definition 26, wherein the portion displayed on the transparent medium is transparent, facilitating viewing of the obstruction through the portion displayed on the transparent medium.

Definition 30. The vehicle vision system of Definition 26, wherein the portion displayed on the transparent medium is opaque, blocking viewing of at least portions of the obstruction through the portion displayed on the transparent medium.

Definition 31. The vehicle vision system of Definition 26 further comprising a second camera mounted to the vehicle to capture an obstructed second image depicting the obstruction, wherein the controller is configured to identify positioning of the obstruction based upon the obstructed second image and wherein the controller is configured to display the portion on the transparent medium at a location based upon the identified positioning of the obstruction.

Definition 32. The vehicle vision system of Definition 26, wherein the controller is configured to geometrically transform the portion and wherein the geometrically transform portion is displayed apparent medium.

Definition 33. The vehicle vision system of Definition 26 comprising a pair of glasses providing the transparent medium.

Definition 34. The vehicle vision system of Definition 26, wherein the vehicle comprises an operator seat and supports a transparent panel proximate the operator seat, the transparent panel providing the transparent medium.

Definition 35. The vehicle vision system of Definition 26, wherein the vehicle comprises a load carrying tool and wherein the controller is configured to display the portion at a location on the transparent medium based upon a height of the load carrying tool.

Definition 36. An invisible bucket system comprising:
a tractor removably supporting a bucket for movement between a raised operator vision obstructing position and a lowered position,
a non-image sensor to detect positioning of the bucket;
a lower forwardly facing camera mounted to the tractor;
an upper forwardly facing camera mounted to the tractor;
a controller configured to:
determine positioning of the bucket at the raised operator vision obstructing position based upon signals from the non-image sensor; and
in response to the bucket being in the raised operator vision obstructing position, replacing pixels of the bucket in an image from the upper forwardly facing camera with perspectively transformed pixels from an image from the lower forwardly facing camera.

Definition 37. The system of Definition 1, wherein the controller is configured to determine positioning of the bucket at the raised operator vision obstructing position additionally based upon signals from the upper forwardly facing camera.

Definition 38. The system of Definition 2, wherein the raised operator vision obstructing position varies between a first bucket and a second bucket different than the first bucket, wherein the controller is configured to identify the bucket as either the first bucket or the second bucket and wherein the controller is configured to apply first value for the raised operator vision obstructing position in response to the bucket being identified as a first bucket and is configured to apply a second value, different than the first value, for the raised operator vision obstructing position in response to the bucket being identified as a second bucket.

Definition 39. The system of Definition 3, wherein the controller is configured to identify the bucket as either the first bucket or the second bucket based upon signals from at least one of the lower forwardly facing cameras and the upper forwardly facing camera.

Definition 40. The system of Definition 4 further comprising a neural network trained to identify the bucket as either the first bucket or the second bucket.

Definition 41. The system of Definition 1, wherein the raised operator vision obstructing position varies between a first bucket and a second bucket different than the first bucket, wherein the controller is configured to identify the bucket as either the first bucket or the second bucket and wherein the controller is configured to apply first value for the raised operator vision obstructing position in response to the bucket being identified as a first bucket and is configured to apply a second value, different than the first value, for the raised operator vision obstructing position in response to the bucket being identified as a second bucket.

Definition 42. The system of Definition 3, wherein the controller is configured to identify the bucket as either the first bucket or the second bucket based upon signals from at least one of the lower forwardly facing cameras and the upper forwardly facing camera.

Definition 43. The system of Definition 1, wherein the bucket comprises a barcode or a QR code located to be read by a scanner carried by the tractor when the bucket is mounted to the tractor when the bucket is mounted to the tractor, the lower forwardly facing camera or the upper forwardly facing camera when releasably mounted to the tractor, the barcode or the QR code identifying the bucket as either the first bucket or the second bucket.

Definition 44. The system of Definition 1, wherein the bucket comprises a wireless sensor tag which outputs wireless signals to the tractor identifying the bucket as either the first bucket or the second bucket.

Definition 45. The system of Definition 1, wherein the tractor comprises a hydraulic lift system for raising and lowering the bucket and wherein the non-image sensor comprises a hydraulic pressure sensor which outputs signals indicating positioning of the bucket.

Definition 46. The system of Definition 1, wherein the tractor comprises a pair of arms which pivot to raise and lower the bucket and wherein the non-image sensor comprises a potentiometer to detect an angle of the pair of arms.

Definition 47. The system of Definition 1, wherein the controller is configured to move the perspectively transformed pixels in unison with movement of the bucket while the bucket is obstructing operator vision.

Definition 48. The system of Definition 1, further comprising an operator interface, wherein the controller is configured to present a transparent window in the image on the operator interface, the transparent window comprising the perspectively transformed pixels, and wherein the operator interface is configured to receive input from an operator to raise or lower the transparent window in the image presented on the operator interface to adjust a value for the raised operator vision obstructing position.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle vision system comprising:
   a vehicle configured to movably support an obstruction between a lowermost position and at least one raised position blocking an operator's view of a scene;
   a lower camera mounted to the vehicle to capture a lower image of the scene beyond the obstruction;
   an upper camera mounted to the vehicle to capture an obstructed upper image depicting the obstruction;
   a controller configured to:
   determine a current height at which the obstruction is supported while raised;
   identify a first portion of the obstructed upper image that comprises the obstruction based upon the determined current height at which the obstruction is supported while raised, the first portion being formed by first pixels;
   identify a second portion of the lower image depicting the scene obstructed by the obstruction, the second portion being formed by second pixels;
   geometrically transform the second pixels based on a perspective of the upper camera;
   replace the first pixels in the obstructed upper image with the geometrically transformed second pixels to form a modified upper image; and
   display the modified upper image to the operator,
   wherein the first portion has a first configuration when the obstruction is supported at a first height while raised and has a second configuration, different than the first configuration, when the obstruction is supported at a second height, while raised, different than the first height.

2. The vehicle vision system of claim 1, wherein the obstruction comprises a load carrying tool.

3. The vehicle vision system of claim 2, wherein the load carrying tool comprises a bucket.

4. The vehicle vision system of claim 2, wherein the obstruction comprises a load carried by the tool and vertically extending beyond the tool.

5. The vehicle vision system of claim 1, wherein the controller is configured to identify the first portion based upon image segmentation of the upper image to identify boundaries of the obstruction.

6. The vehicle vision system of claim 1, wherein the controller is configured to identify the first portion based upon the current height at which the obstruction is supported while raised and generic obstruction specifications.

7. The vehicle vision system of claim 6, wherein the generic obstruction specifications comprise operator input specifications for a load carrying tool of the vehicle.

8. The vehicle vision system of claim 6, wherein the generic obstruction specifications comprises operator input or stored specifications for a load lifted or carried by the vehicle.

9. The vehicle vision system of claim 1, wherein the controller is configured to identify the first portion based upon a sensed weight of the obstruction carried by the vehicle.

10. The vehicle vision system of claim 1 further comprising a non-image sensor configured to output signals indicating the current height at which the obstruction is supported while raised, wherein controller is configured to identify the first portion based upon the current height at which the obstruction is supported while raised.

11. The vehicle vision system of claim 1 further comprising a library of stored obstruction specifications, wherein the controller is configured to identify the first portion based upon the current height at which the obstruction is supported while raised and a selected one of the obstruction specifications.

12. The vehicle vision system of claim 1, wherein the controller is configured to receive input from the operator defining a configuration of the first portion.

13. The vehicle vision system of claim 12 further comprising a display, wherein the controller is configured to present the upper image on the display and wherein the input received from the operator defining the configuration of the first portion is presented on the upper image on the display.

14. The vehicle vision system of claim 1, wherein the controller is configured to adjust a configuration of the first portion based upon the current height at which the obstruction is supported while raised as the obstruction is vertically moved by the vehicle.

15. The vehicle vision system of claim 1 further comprising a display, wherein the upper camera is configured to capture an unobstructed upper image of the scene, wherein the controller is configured to automatically switch from presenting the unobstructed upper image of the scene and the modified upper image on the display based upon the current height at which the obstruction is supported while raised.

16. The vehicle vision system of claim 15, wherein the vehicle comprises a load carrying tool that is raised and lowered by the vehicle and wherein the controller is configured to present the unobstructed upper image of the scene in response to the load carrying tool being at a height without supporting a load and is configured to present the modified upper image in response to the load carrying tool being at the height while supporting a load.

17. The vehicle vision system of claim 1 further comprising a display, wherein the controller is configured to:
present the obstructed upper image on the display;
determine presence of a predefined target in the lower image; and
automatically switch from presenting the obstructed upper image on the display to presenting the modified upper image on the display based upon the presence of the predefined target in the lower image.

18. The vehicle vision system of claim 17, wherein the controller is configured to switch from presenting the obstructed upper image on the display to presenting the modified upper image on the display additionally based upon a determined distance between the predefined target and the vehicle.

19. The vehicle vision system of claim 1, wherein the first portion has an outline corresponding to an outline of the obstruction.

20. The vehicle vision system of claim 1, wherein the vehicle comprises a load carrying tool for vertically raising and lowering a load and wherein the first portion has an outline corresponding to an outline of the load being carried by the load carrying tool.

21. A vehicle vision system comprising:
a vehicle configured to movably support an obstruction blocking an operator's view of a scene;
a lower camera mounted to the vehicle to capture a lower image of the scene beyond the obstruction;
an upper camera mounted to the vehicle to capture an obstructed upper image depicting the obstruction;
a controller configured to:
identify a first portion of the obstructed upper image that comprises the obstruction, the first portion being formed by first pixels;
identify a second portion of the lower image depicting the scene obstructed by the obstruction, the second portion being formed by second pixels;
geometrically transform the second pixels based on a perspective of the upper camera; and
replace the first pixels in the obstructed upper image with the geometrically transformed second pixels to form a modified upper image; and
display the modified upper image to the operator, wherein the controller is configured to receive input from the operator defining a configuration of the first portion.

22. A vehicle vision system comprising:
a vehicle configured to movably support an obstruction blocking an operator's view of a scene;
a lower camera mounted to the vehicle to capture a lower image of the scene beyond the obstruction;
an upper camera mounted to the vehicle to capture an obstructed upper image depicting the obstruction;
a controller configured to:
identify a first portion of the obstructed upper image that comprises the obstruction, the first portion being formed by first pixels;
identify a second portion of the lower image depicting the scene obstructed by the obstruction, the second portion being formed by second pixels;
geometrically transform the second pixels based on a perspective of the upper camera;
replace the first pixels in the obstructed upper image with the geometrically transformed second pixels to form a modified upper image; and
display the modified upper image to the operator; and
a display, wherein the upper camera is configured to capture an unobstructed upper image of the scene, wherein the controller is configured to automatically switch from presenting the unobstructed upper image of the scene and the modified upper image on the display based upon a height of the obstruction.

* * * * *